(12) United States Patent
Kawano et al.

(10) Patent No.: US 10,451,327 B2
(45) Date of Patent: Oct. 22, 2019

(54) REFRIGERATION CYCLE DEVICE

(71) Applicant: DENSO CORPORATION, Kariya, Aichi-pref. (JP)

(72) Inventors: Hiroaki Kawano, Kariya (JP); Takuya Tanihata, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/577,356

(22) PCT Filed: Apr. 26, 2016

(86) PCT No.: PCT/JP2016/063010
§ 371 (c)(1),
(2) Date: Nov. 28, 2017

(87) PCT Pub. No.: WO2016/208268
PCT Pub. Date: Dec. 29, 2016

(65) Prior Publication Data
US 2018/0149396 A1  May 31, 2018

(30) Foreign Application Priority Data
Jun. 24, 2015  (JP) .................. 2015-126787

(51) Int. Cl.
*F25B 49/02*  (2006.01)
*F24F 11/89*  (2018.01)
(Continued)

(52) U.S. Cl.
CPC ....... *F25B 49/022* (2013.01); *B60H 1/00921* (2013.01); *B60H 1/3213* (2013.01);
(Continued)

(58) Field of Classification Search
CPC ...... F25B 59/005; F25B 59/02; F25B 59/022; F25B 2500/24; F25B 2700/04;
(Continued)

(56) References Cited

U.S. PATENT DOCUMENTS

2009/0126375 A1* 5/2009 Toyoshima ............. F25B 45/00
  62/77
2012/0266622 A1  10/2012 Inaba et al.
(Continued)

FOREIGN PATENT DOCUMENTS

DE         4008877      10/1991
DE     102006039925     1/2011
(Continued)

*Primary Examiner* — Marc E Norman
(74) *Attorney, Agent, or Firm* — Harness, Dickey & Pierce, P.L.C.

(57) ABSTRACT

A refrigeration cycle device includes a charged-amount determination unit that executes a charged-amount determination to determine whether the refrigeration cycle device is in a refrigerant shortage state or not, a compressor control unit that controls a compressor, and a decompression control unit that controls a throttle opening degree of a decompression device. The charged-amount determination unit determines that the refrigeration cycle device is in the refrigerant shortage state when a heat dissipation capacity of a radiator shows a tendency to decrease in a case where the decompression control unit decreases a throttle opening degree of the decompression device while the compressor control unit operates the compressor.

12 Claims, 11 Drawing Sheets

(51) Int. Cl.
    *F25B 5/04*      (2006.01)
    *F25B 6/04*      (2006.01)
    *B60H 1/00*      (2006.01)
    *B60H 1/32*      (2006.01)
    *F25B 49/00*     (2006.01)

(52) U.S. Cl.
    CPC ............... *F24F 11/89* (2018.01); *F25B 5/04* (2013.01); *F25B 6/04* (2013.01); *F25B 49/005* (2013.01); *F25B 49/02* (2013.01); *B60H 2001/3272* (2013.01); *B60H 2001/3285* (2013.01); *F25B 2400/0409* (2013.01); *F25B 2400/0411* (2013.01); *F25B 2500/19* (2013.01); *F25B 2500/24* (2013.01); *F25B 2600/0251* (2013.01); *F25B 2600/2501* (2013.01); *F25B 2600/2513* (2013.01); *F25B 2700/04* (2013.01); *F25B 2700/195* (2013.01); *F25B 2700/1931* (2013.01); *F25B 2700/21152* (2013.01); *F25B 2700/21162* (2013.01); *F25B 2700/21163* (2013.01); *F25B 2700/21172* (2013.01)

(58) Field of Classification Search
    CPC ........ F25B 2700/1931; F25B 2700/195; F25B 49/005; F25B 49/02; F25B 49/022; B60H 1/3213; B60H 2001/3285; F24F 11/89
    See application file for complete search history.

(56) References Cited

U.S. PATENT DOCUMENTS

| | | |
|---|---|---|
| 2015/0040594 A1 | 2/2015 | Suzuki et al. |
| 2016/0146488 A1* | 5/2016 | Ochiai ............... F25B 13/00 62/125 |
| 2016/0375743 A1 | 12/2016 | Suzuki et al. |
| 2017/0028815 A1 | 2/2017 | Suzuki et al. |
| 2017/0028816 A1 | 2/2017 | Suzuki et al. |
| 2017/0028817 A1 | 2/2017 | Suzuki et al. |
| 2017/0080777 A1 | 3/2017 | Suzuki et al. |

FOREIGN PATENT DOCUMENTS

| | | |
|---|---|---|
| EP | 2869001 A1 | 5/2015 |
| JP | H08313123 A | 11/1996 |
| JP | 2013212799 A | 10/2013 |
| JP | 2014009869 A | 1/2014 |

* cited by examiner

|  | AIR-COOLING MODE | DEHUMIDIFICATION HEATING MODE | AIR-HEATING MODE |
|---|---|---|---|
| LOW-PRESSURE SIDE ON-OFF VALVE | CLOSED STATE | CLOSED STATE | OPEN STATE |

|  | AIR-COOLING MODE | DEHUMIDIFICATION HEATING MODE | AIR-HEATING MODE |
|---|---|---|---|
| FIRST EXPANSION VALVE | FULLY OPENED STATE | FULLY OPENED STATE | THROTTLE STATE |
| SECOND EXPANSION VALVE | THROTTLE STATE | THROTTLE STATE | COMPLETELY CLOSED STATE |

REFRIGERATION CYCLE DEVICE

CROSS REFERENCE TO RELATED APPLICATIONAPPLICATIONS

This application is a U.S. National Phase Application under 35 U.S.C. 371 of International Application No. PCT/JP2016/063010 filed on Apr. 26, 2016 and published in Japanese as WO 2016/208268 A1 on Dec. 29, 2016. This application is based on and claims the benefit of priority from Japanese Patent Application No. 2015-126787 filed on Jun. 24, 2015. The entire disclosures of all of the above applications are incorporated herein by reference.

FIELD OF THE INVENTION

The present disclosure relates to a refrigeration cycle device.

BACKGROUND ART

Conventionally, there is a known heat pump cooling and heating device that determines a shortage of a refrigerant in a cycle, based on the pressure of a high-pressure refrigerant in the cycle and thereby protects a compressor when the cycle is determined to be running short of the refrigerant (see, e.g., Patent Document 1).

Specifically, Patent Document 1 discloses that the operation of the compressor is stopped because of the shortage of the refrigerant when the pressure of the high-pressure refrigerant in the cycle becomes equal to or lower than a pressure value, which is slightly higher than the atmospheric pressure, after a predetermined time has elapsed since the start of the operation of the compressor.

Patent Document 1: Japanese Unexamined Patent Application Publication No. H08-313123

SUMMARY OF THE INVENTION

The refrigerant used in the refrigeration cycle device has the property that its pressure becomes lower as its temperature decreases. For example, in the refrigerant, such as R134a, under an ultra-low temperature condition in which the outside air temperature is, for example, −30° C. or lower, the pressure of the high-pressure refrigerant occasionally becomes equal to or lower than the atmospheric pressure (approximately 101.3 kPa).

As described in Patent Document 1, suppose that the cycle is determined to be running short of the refrigerant when the pressure of the high-pressure refrigerant in the cycle is equal to or lower than the pressure value which is slightly higher than the atmospheric pressure. In such a case, even though the charged amount of the refrigerant is actually within an allowable range, the determination result could show the refrigerant shortage. This determination might stop the compressor unnecessarily and thus is undesirable.

Therefore, it is an object of the present disclosure to provide a refrigeration cycle device that can appropriately determine the shortage of the charged amount of the refrigerant, regardless of the temperature of the external environment.

To achieve the above-mentioned object, the inventors have diligently studied a refrigeration cycle device. Consequently, the inventors have found that the behavior of the refrigeration cycle device differs between a normal state and a refrigerant shortage state when decreasing a throttle opening degree of a decompression device. Here, in the normal state, the charged amount of the refrigerant in the cycle of the refrigeration cycle device is sufficient. Meanwhile, in the refrigerant shortage state, the charged amount of the refrigerant is insufficient.

That is, the inventors have found that in the normal state where the charged amount of the refrigerant in the cycle is sufficient, the heat dissipation capacity of the radiator tends to increase because the amount of heat absorption in the evaporator is increased, when the throttle opening degree of the decompression device is decreased during the operation of the compressor.

In contrast, the inventors have found that in the refrigerant shortage state where the charged amount of the refrigerant in the cycle is insufficient, the heat dissipation capacity of the radiator tends to decrease at one throttle opening degree or less of the decompression device, when the throttle opening degree thereof is decreased during the operation of the compressor.

The inventors have conceived of a refrigeration cycle device that can achieve the above-mentioned object by focusing on a difference in the behavior of the refrigeration cycle device between a normal state in which the charged amount of the refrigerant in the cycle is sufficient, and a refrigerant shortage state in which the charged amount of the refrigerant is insufficient.

According to an aspect of the present disclosure, a refrigeration cycle device includes:

- a compressor that compresses and discharges a refrigerant;
- a radiator that dissipates heat from a high-pressure refrigerant discharged from the compressor;
- a decompression device that decompresses the high-pressure refrigerant having passed through the radiator;
- an evaporator that evaporates a low-pressure refrigerant decompressed by the decompression device;
- an accumulator that separates the low-pressure refrigerant having passed through the evaporator into a gas phase refrigerant and a liquid phase refrigerant and causes the separated gas phase refrigerant to flow out toward a side of a suction port of the compressor;
- a charged-amount determination unit that executes a charged-amount determination to determine whether or not it is in a refrigerant shortage state where a charged amount of the refrigerant charged in a refrigerant cycle is insufficient;
- a compressor control unit that controls an operating state of the compressor; and
- a decompression control unit that controls a throttle opening degree of the decompression device.

Furthermore, the charged-amount determination unit determines the refrigerant shortage state, when a heat dissipation capacity of the radiator shows a tendency to decrease in a case where the decompression control unit decreases a throttle opening degree of the decompression device while the compressor control unit operates the compressor.

In this way, the refrigeration cycle device is configured to determine whether to be in the refrigerant shortage state or not, based on a change in the heat dissipation capacity of the radiator, when decreasing the throttle opening degree of the decompression device during the operation of the compressor. Thus, it is possible to appropriately determine whether the refrigeration cycle device is in the refrigerant shortage state or not, regardless of the temperature of the external environment, the properties of the refrigerant, and the like.

The heat dissipation capacity of the radiator tends to change in correlation with the pressure of the high-pressure refrigerant. Specifically, the heat dissipation capacity of the radiator tends to decrease as the pressure of the high-pressure refrigerant is reduced. Meanwhile, the heat dissipation capacity of the radiator tends to increase as the pressure of the high-pressure refrigerant is raised.

According to another aspect of the present disclosure, a refrigeration cycle device includes a high-pressure side pressure detector that detects a pressure of the high-pressure refrigerant that leads from a side of a refrigerant discharge port of the compressor to a side of a refrigerant inlet of the decompression device. Further, the charged-amount determination unit in the refrigeration cycle device determines that the refrigeration cycle device is in the refrigerant shortage state when the pressure of the high-pressure refrigerant shows a tendency to decrease when the decompression control unit decreases the throttle opening degree of the decompression device while the compressor control unit operates the compressor.

In this way, the refrigeration cycle device is configured to determine whether to be in the refrigerant shortage state or not, based on the pressure of the high-pressure refrigerant that changes in correlation with the heat dissipation capacity of the radiator. Thus, it is possible to improve the accuracy of determination about whether the refrigeration cycle device is in the refrigerant shortage state or not.

DESCRIPTION OF EMBODIMENTS

Figure 1:
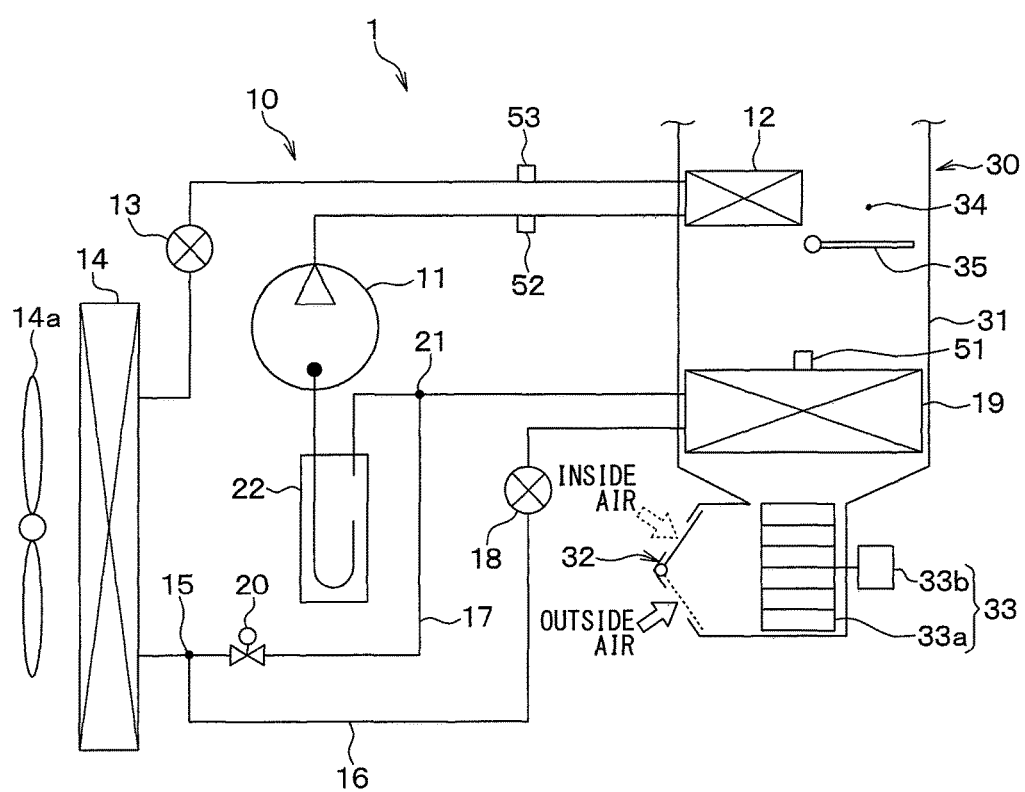
FIG. 1 is an entire configuration diagram of a vehicle air conditioner that includes a refrigeration cycle device according to a first embodiment.

Embodiments of the present disclosure will be described below with reference to the accompanying drawings. In the following respective embodiments, the same or equivalent parts as those explained in the previous embodiments are denoted by the same reference numerals, and the description thereof will be omitted in some cases.

When only a part of a component is explained in the embodiments below, other parts of the component can be applied to components explained in the previous embodiment(s).

When there are a plurality of embodiments, some of them can be partially combined to each other, especially, as long as the combination does not cause any problem, unless otherwise specified.

First Embodiment

First, a first embodiment will be described with reference to FIGS. 1 to 14. In this embodiment, a refrigeration cycle device 10 of the present disclosure is used in a vehicle air conditioner 1 by way of example.

The vehicle air conditioner 1 in this embodiment can be configured to be switched to an air-cooling mode of performing air-cooling of a vehicle interior as a space to be air-conditioned, a dehumidification heating mode of performing air-heating while dehumidifying the vehicle interior, or an air-heating mode of performing air-heating of the vehicle interior.

The vehicle air conditioner 1 in this embodiment can be configured to execute not only normal air-conditioning which involves air-conditioning of the vehicle interior while an occupant is riding on the vehicle, but also pre-air-conditioning which involves air-conditioning of the vehicle interior before the occupant rides on the vehicle. The vehicle air conditioner 1 in this embodiment is configured to execute the pre-air-conditioning with power supplied from a vehicle-mounted battery (not shown) or an external power source.

As shown in FIG. 1, the vehicle air conditioner 1 in this embodiment includes the refrigeration cycle device 10 and an interior air-conditioning unit 30 as main components.

The refrigeration cycle device 10 is configured of a vapor compression refrigeration cycle that includes a compressor 11, an interior condenser 12, a first expansion valve 13, an exterior heat exchanger 14, a second expansion valve 18, an interior evaporator 19, and an accumulator 22.

The refrigeration cycle device 10 in this embodiment configures a vapor compression subcritical refrigeration cycle in which a high-pressure side refrigerant pressure in the cycle does not exceed the critical pressure of the refrigerant, using a hydrofluorocarbon (HFC)-based refrigerant (e.g., R134a) as the refrigerant. Obviously, a hydrofluoroolefin (HFO)-based refrigerant (e.g., R1234yf) or the like may be adopted as the refrigerant.

The refrigerant in the refrigeration cycle device 10 contains a refrigerant oil mixed therein as a lubricant oil for lubricating respective components inside the compressor 11. Part of the lubricating oil circulates through the cycle with the refrigerant.

The compressor 11 as a component of the refrigeration cycle device 10 is disposed in an internal space of a bonnet (not shown) of the vehicle. The compressor 11 serves to draw, compress, and discharge the refrigerant in the refrigeration cycle device 10.

The compressor 11 is configured of an electric compressor that has a compression mechanism (not shown) driven by an electric motor (not shown). The compression mechanism suitable for use can include various types of compression mechanisms, such as a scroll compression mechanism and a vane compression mechanism. The electric motor is an AC motor that has its operation controlled by AC current output from an inverter 11a shown in FIG. 2.

The interior condenser 12 is connected to the side of a refrigerant discharge port of the compressor 11. The interior condenser 12 is a radiator that dissipates heat from a high-pressure refrigerant discharged from the compressor 11. The interior condenser 12 in this embodiment is disposed in an air-conditioning case 31 of the interior air-conditioning unit 30 to be described later. The interior condenser 12 is a heat exchanger that exchanges heat between the high-pressure refrigerant discharged from the compressor 11 and ventilation air passing through the interior evaporator 19, thereby heating the ventilation air.

The first expansion valve 13 is connected to a side of a refrigerant outlet of the interior condenser 12. The first expansion valve 13 is a decompression device that decompresses the high-pressure refrigerant flowing out of the interior condenser 12. The first expansion valve 13 includes a valve body that has a variable throttle opening degree and an actuator that drives the valve body.

The first expansion valve 13 in this embodiment is configured of a variable throttle mechanism that can be set at each of a throttle state of exhibiting the decompression function and a fully open state of not exhibiting the decompression function. Further, the first expansion valve 13 is configured of an electric variable throttle mechanism that is controlled by a control signal from an air-conditioning controller 50.

The exterior heat exchanger 14 is connected to a side of the refrigerant outlet of the first expansion valve 13. The exterior heat exchanger 14 is a heat exchanger that is disposed in the internal space of the bonnet in the vehicle and exchanges heat between the refrigerant having passed through the first expansion valve 13 and air outside a vehicle compartment (i.e., outside air) blown from an exterior fan 14a.

The exterior heat exchanger 14 serves as an evaporator that evaporates a low-pressure refrigerant having passed through the first expansion valve 13 as the decompression device in the air-heating mode. Further, the exterior heat exchanger 14 serves as a radiator that dissipates heat from the high-pressure refrigerant discharged from the compressor 11 in at least the air-cooling mode. It can be interpreted that in the refrigeration cycle device 10 of this embodiment, the exterior heat exchanger 14 configures the evaporator that evaporates the low-pressure refrigerant having passed through the first expansion valve 13 as the decompression device.

Here, the exterior fan 14a is a blower that allows the outside air to flow into the exterior heat exchanger 14. The exterior fan 14a in this embodiment is configured of an electric fan that is controlled by a control signal output from the air-conditioning controller 50.

The side of the refrigerant outlet of the exterior heat exchanger 14 is connected to a low-pressure side branch portion 15 that branches the flow of refrigerant flowing out of the exterior heat exchanger 14. The low-pressure side branch portion 15 is configured of a three-way joint with three inflow/outflow ports, one of which serves as a refrigerant inflow port, and the remaining two of which serve as refrigerant outflow ports.

In the low-pressure side branch portion 15, one refrigerant outflow port is connected to a low-pressure refrigerant passage 16, and the other refrigerant outflow port is connected to a low-pressure bypass passage 17. The low-pressure refrigerant passage 16 is a refrigerant passage that guides the refrigerant to the accumulator 22, to be described later, via the second expansion valve 18 and the interior evaporator 19.

The second expansion valve 18 is a decompression device that decompresses the refrigerant flowing out of the exterior heat exchanger 14 that serves as a radiator. The second expansion valve 18 in this embodiment is configured of a variable throttle mechanism that can be set at each of a throttle state of exhibiting the decompression function and a completely closed state of interrupting the flow of the refrigerant. Furthermore, the second expansion valve 18 is configured of an electric variable throttle mechanism that is controlled by a control signal output from the air-conditioning controller 50 in the same manner as the first expansion valve 13.

The interior evaporator 19 is disposed on an upstream side of the air flow with respect to the interior condenser 12 within the air-conditioning casing 31 of the interior air-conditioning unit 30 to be described later. The interior evaporator 19 is an evaporator that evaporates a low-pressure refrigerant having passed through the second expansion valve 18 as the decompression device. Further, the interior evaporator 19 in this embodiment is the evaporator that cools ventilation air provided before passing through the interior condenser 12, by exchanging heat between the ventilation air and the low-pressure refrigerant having passed through the second expansion valve 18 to thereby evaporate the low-pressure refrigerant.

The low-pressure bypass passage 17 is a refrigerant passage that guides the refrigerant to the accumulator 22, to be described later, while bypassing the second expansion valve 18 and the interior evaporator 19. The low-pressure bypass passage 17 is provided with a low-pressure side on-off valve 20 that opens and closes the low-pressure bypass passage 17.

The refrigerant flowing out of the exterior heat exchanger 14 flows into the low-pressure bypass passage 17 when the low-pressure side on-off valve 20 is opened, and the second expansion valve 18 is in a completely closed state. Meanwhile, the refrigerant flowing out of the exterior heat exchanger 14 flows into the low-pressure refrigerant passage 16 when the low-pressure side on-off valve 20 is closed, and the second expansion valve 18 is in a throttled state. Therefore, in this embodiment, the low-pressure side on-off valve 20 and the second expansion valve 18 serve as a passage switching portion that switches the refrigerant passage for the refrigerant flowing out of the exterior heat exchanger 14 to either the low-pressure refrigerant passage 16 or low-pressure bypass passage 17. The low-pressure side on-off valve 20 may be configured of a flow-path switching valve. When the low-pressure side on-off valve 20 is configured of the flow-path switching valve, the flow-path switching valve may be disposed in the low-pressure side branch portion 15 or a low-pressure side merging portion 21.

The low-pressure side merging portion 21 between the low-pressure refrigerant passage 16 and the low-pressure bypass passage 17 is connected to the downstream side of the refrigerant flow with respect to the interior evaporator 19 and the low-pressure side on-off valve 20. The low-pressure side merging portion 21 is configured of a three-way joint with three inflow/outflow ports, one of which serves as a refrigerant outflow port, and the remaining two of which serve as refrigerant inflow ports.

The accumulator 22 is connected to a side of the refrigerant outflow port of the low-pressure side merging portion 21. The accumulator 22 separates the refrigerant flowing thereinto into a gas-phase refrigerant and a liquid-phase refrigerant, and flows out the separated gas-phase refrigerant and a lubricant oil contained in the refrigerant toward a side of the refrigerant suction port of the compressor 11.

The accumulator 22 also serves as a reservoir to store the liquid-phase refrigerant separated therein as an excess refrigerant in the cycle. Thus, the accumulator 22 serves to suppress the drawing of the liquid-phase refrigerant into the compressor 11 and to prevent the liquid compression in the compressor 11.

Next, the interior air-conditioning unit 30 will be described. The interior air-conditioning unit 30 is disposed inside a dashboard (i.e., an instrumental panel) at the foremost portion of the vehicle interior. The interior air-conditioning unit 30 has the air-conditioning case 31 that forms its outer shell and an air passage for ventilation air to be blown into the vehicle interior.

On the most upstream side of the air flow in the air-conditioning case 31, an inside/outside air switch 32 is disposed to switch between air inside the vehicle compartment (i.e., inside air) and the outside air and to introduce the switched air into the air-conditioning case. The inside/outside air switch 32 is a device that adjusts opening areas of an inside-air introduction port and an outside-air introduction port by using an inside/outside air switching door, thereby changing the ratio of the volume of the inside air to that of the outside air into the air-conditioning case 31.

A blower 33 is disposed on the downstream side of the air flow with respect to the inside/outside air switch 32 so as to blow the air, introduced thereinto from the inside/outside air switch 32, toward the vehicle interior. The blower 33 is an electric blower that includes a centrifugal fan 33a, such as a Sirocco fan, driven by an electric motor 33b. The blower 33 has its blowing capacity (for example, the number of revolutions) controlled by a control voltage output from the air-conditioning controller 50.

On the downstream side of the air flow relative to the blower 33, the interior evaporator 19 and the interior condenser 12 are disposed in this order with respect to the ventilation air flow. In other words, the interior evaporator 19 is disposed on the upstream side of the air flow with respect to the interior condenser 12.

A cold-air bypass passage 34 is provided inside the air-conditioning casing 31 to allow the ventilation air having passed through the interior evaporator 19 to flow while bypassing the interior condenser 12. An air mix door 35 is disposed within the air-conditioning case 31 on the downstream side of the air flow with respect to the interior evaporator 19 and on the upstream side of the air flow with respect to the interior condenser 12.

The air mix door 35 serves as a temperature adjustment portion that adjusts the temperature of air to be blown into the vehicle interior by regulating the ratio of the volume of the air passing through the interior condenser 12 to the volume of the air passing through the cold-air bypass passage 34 in ventilation air having passed through the interior evaporator 19. The air mix door 35 has its operation controlled by a control signal output from the air-conditioning controller 50.

A merging space (not shown) for merging hot air having passed through the interior condenser 12 and cold air having passed through the cold-air bypass passage 34 is formed on the downstream side of the air flow with respect to the interior condenser 12 and the cold-air bypass passage 34.

The air-conditioning case 31 has, at its part on the most downstream side of the air flow, a plurality of openings through which the ventilation air merged in the merging space is blown out toward the vehicle interior. Although not shown, the air-conditioning case 31 is provided with the openings that include a defroster opening for blowing out the air toward the inner surface of a windshield of the vehicle, a face opening for blowing out the conditioned air toward the upper body of the occupant in the vehicle interior, and a foot opening for blowing out the conditioned air toward the feet of the occupant.

Although not shown, a defroster door, a face door, and a foot door are disposed on the upstream side of the air flow with respect to the respective openings, as blowing mode doors for adjusting the opening areas of the respective openings. These blowing mode doors are driven by an actuator that has its operation controlled by a control signal output from the air-conditioning controller 50 via a link mechanism (not shown) or the like.

A face air outlet, a foot air outlet, and a defroster air outlet (not shown), provided in the vehicle interior, are connected to the downstream side of the air flow with respect to the respective openings via ducts forming respective air passages.

Figure 2:
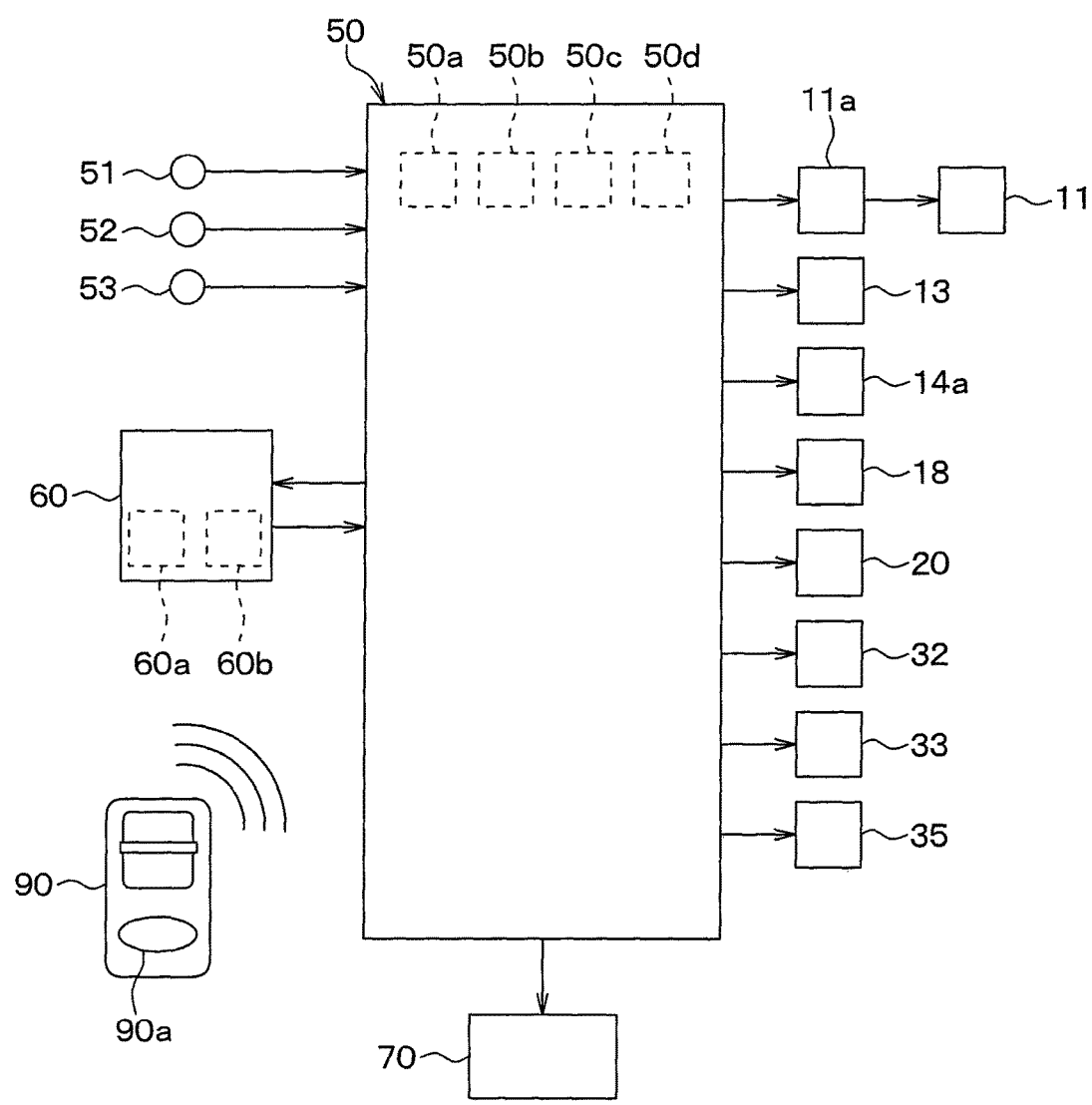
FIG. 2 is a block diagram showing an air-conditioning controller of the refrigeration cycle device according to the first embodiment.

Next, an electronic control unit of the refrigeration cycle device 10 in this embodiment will be described with reference to FIG. 2. The air-conditioning controller 50 is configured of a microcomputer including a storage unit, such as the CPU, ROM, and RAM, and a peripheral circuit thereof. The air-conditioning controller 50 performs various computations and processing based on control programs stored in the storage unit. The air-conditioning controller 50 controls the operations of various air-conditioning control target devices to be controlled that are connected to its output side, based on the various computations and processing. The storage unit in the air-conditioning controller 50 is configured of a non-transitional physical storage medium.

A group of air-conditioning control sensors is connected to the input side of the air-conditioning controller 50. Specifically, the air-conditioning controller 50 is connected to sensors for detecting the state of the environment inside and outside the vehicle, which include an inside-air sensor for detecting the inside-air temperature, an outside-air sensor for detecting the outside-air temperature, and a solar radiation sensor for detecting the amount of solar radiation into the vehicle interior.

The air-conditioning controller 50 is connected to a sensor that detects an operating state of the refrigeration cycle device 10. Specifically, the air-conditioning controller 50 is connected to a first temperature sensor 51, a second temperature sensor 52, a refrigerant pressure sensor 53, and the like. The first temperature sensor 51 detects the temperature of air having passed through the interior evaporator 19. The second temperature sensor 52 detects the temperature of the high-pressure refrigerant discharged from the compressor 11. The refrigerant pressure sensor 53 detects the pressure of the refrigerant having passed through the interior condenser 12.

In this embodiment, the refrigerant pressure sensor 53 configures a high-pressure side pressure detector that detects the pressure of the high-pressure refrigerant that leads from the side of the refrigerant discharge port of the compressor 11 to the side of the refrigerant inlet of the first expansion valve 13 as the decompression device. For convenience of explanation, in this embodiment, the temperature of the air having passed through the interior evaporator 19 is sometimes hereinafter referred to as an evaporator temperature Te. In this embodiment, the temperature of the high-pressure refrigerant discharged from the compressor 11 is sometimes hereinafter referred to as a discharge refrigerant temperature Th. Furthermore, in this embodiment, the pressure of the refrigerant having passed through the interior condenser 12 is sometimes hereinafter referred to as a discharge refrigerant pressure Ph.

The first temperature sensor 51 can be considered to be a sensor that directly detects the temperature of a heat exchange fin in the interior evaporator 19 as the evaporator temperature Te, a sensor that indirectly detects the temperature of the refrigerant flowing through the interior evaporator 19 as the evaporator temperature Te, or the like, but may use either sensor.

The second temperature sensor 52 can be considered to be a sensor that directly detects a discharge refrigerant temperature Th at the compressor 11, a sensor that indirectly detects the temperature of the heat exchange fin in the interior condenser 12 as the discharge refrigerant temperature Th, or the like, but may use either sensor.

The air-conditioning controller 50 is connected to an operation panel 60 on which various air-conditioning operation switches are disposed. Operation signals from various air-conditioning operation switches on the operation panel 60 are input to the air-conditioning controller 50.

The operation panel 60 is provided with various air-conditioning operation switches, which include an actuation switch for the vehicle air conditioner 1, a temperature setting switch for setting a target temperature of the vehicle interior, and an A/C switch for setting whether the ventilation air is cooled by the interior evaporator 19 or not.

Further, the operation panel 60 in this embodiment is provided with an automatic setting switch 60a for setting automatic air-conditioning that automatically controls various control target devices and a manual setting unit 60b for setting manual air-conditioning that controls various control target devices through an occupant's manual setting.

The manual setting unit 60b is provided with an operation mode switch for setting an operation mode of the refrigeration cycle device 10, a blown volume adjustment switch for setting the blowing capacity of the blower 33, a suction setting switch for setting a suction port mode, a blowing setting switch for setting an air outlet mode, and the like.

The air-conditioning controller 50 in this embodiment is connected to an informing unit 70 that informs an occupant as a user of abnormality of the refrigeration cycle device 10. The informing unit 70 can be considered to be a voice informing unit that informs the abnormality by voice, a warning light on the dashboard, a display-type informing unit that informs the abnormality by displaying an abnormal state on a display of a navigation system, and the like, but any one of these forms may be used.

The air-conditioning controller 50 is provided with a wireless terminal 90 (for example, a remote controller) carried by the occupant and a transceiver 50a that transmits and receives a control signal with respect to a mobile communication device (for example, cellular phone). The wireless terminal 90 has a pre-air-conditioning request switch 90a for requesting the start of pre-air-conditioning.

The air-conditioning controller 50 in this embodiment is a device that integrates therein control units (for example, hardware and software) for controlling the operations of various control target devices connected to its output side and control units (for example, hardware and software) for executing various types of determination processing.

For example, a charged-amount determination unit 50b in the air-conditioning controller 50 configures a component that executes charged-amount determination processing to determine whether or not the refrigeration cycle device is in the refrigerant shortage state where the charged amount of the refrigerant in the cycle is insufficient. A compressor control unit 50c in the air-conditioning controller 50 configures a component that controls an operating state of the compressor 11 via the inverter 11a. A decompression control unit 50d in the air-conditioning controller 50 configures a component that controls the respective throttle opening degrees of the expansion valves 13 and 18.

Now, the operation of the refrigeration cycle device 10 with the above-mentioned configuration and the vehicle air conditioner 1 will be described. The vehicle air conditioner 1 in this embodiment can be switched to any one of the air-cooling mode, the air-heating mode, and the dehumidification heating mode by the air-conditioning control processing executed by the air-conditioning controller 50.

The air-conditioning control processing executed by the air-conditioning controller 50 will be described with reference to a flowchart shown in FIG. 3. The air-conditioning control processing is executed with power supplied to the air-conditioning controller 50, regardless of whether or not the occupant as the user is riding on the vehicle. Note that the respective steps of the flowchart shown in FIG. 3 are implemented by the air-conditioning controller 50 and can be interpreted as a function implementation portion that implements each of the functions in the respective steps.

Figure 3:
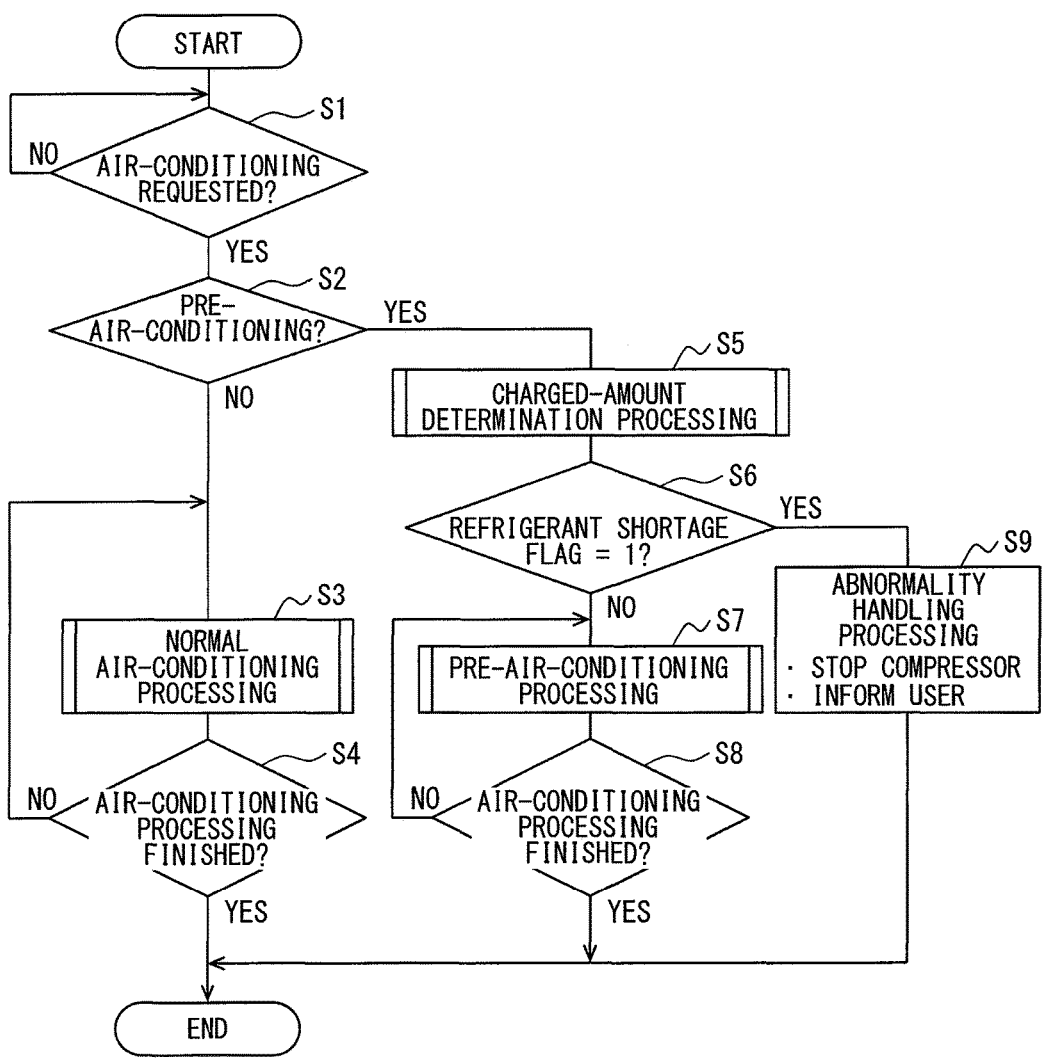
FIG. 3 is a flowchart showing the flow of air-conditioning control processing executed by the air-conditioning controller according to the first embodiment.

First, as shown in FIG. 3, in the air-conditioning control processing, the air-conditioning controller 50 determines whether the air-conditioning of the vehicle interior is requested or not (S1). Specifically, whether or not the actuation switch of the operation panel 60 is powered on (for example, turned on), and whether or not the pre-air-conditioning request switch 90a of the wireless terminal 90 is powered on (for example, turned on) are determined.

When the air-conditioning of the vehicle interior is determined to be requested based on the result of the determination processing in step S1, the air-conditioning controller 50 determines whether or not the request for air-conditioning of the vehicle interior is intended for the pre-air-conditioning (S2). Specifically, in the determination processing at step S2, it is determined whether or not a signal requesting the pre-air-conditioning is transmitted from the wireless terminal 90 to the air-conditioning controller 50.

When the request for air-conditioning of the vehicle interior is determined not to be intended for the pre-air-conditioning based on the result of the determination processing in step S2, the air-conditioning controller 50 executes the normal air-conditioning processing (S3). The details of the normal air-conditioning processing in step S3 will be described below using the flowchart of FIG. 4.

Figure 4:
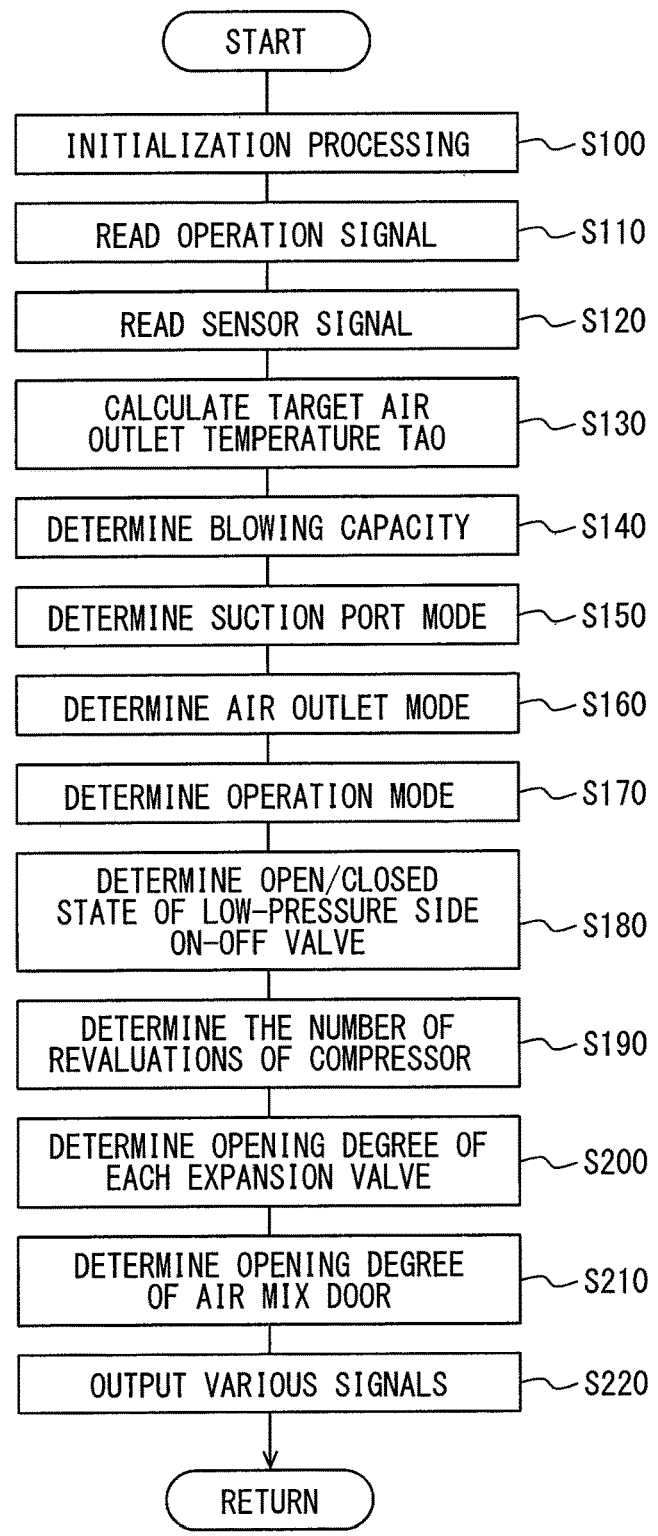
FIG. 4 is a flowchart showing the flow of normal air-conditioning processing executed by the air-conditioning controller according to the first embodiment.

As shown in FIG. 4, the air-conditioning controller 50 performs initialization processing, which includes initialization of a flag, a timer, etc., stored in a storage unit, and aligning various control target devices at respective initialization positions (S100). In the initialization processing, such a parameter is sometimes aligned with a previous value stored in the storage unit when the operation of the refrigeration cycle device 10 is stopped.

For example, a refrigerant shortage flag, mentioned later, is aligned with a previous value stored in the storage unit when the operation of the refrigeration cycle device 10 is stopped. Note that the initialization processing is processing that is executed only once at the start of the operation of the refrigeration cycle device 10. That is, after the initialization processing is executed once, the operation skips this processing and proceeds to next processing (S110).

Subsequently, the air-conditioning controller 50 reads an operation signal from the operation panel 60 (S110). The air-conditioning controller 50 reads in respective sensor signals from the group of the air-conditioning control sensors (S120). Then, the air-conditioning controller 50 calculates a target air outlet temperature TAO of the ventilation air to be blown into the vehicle interior based on various signals read in processing at steps S110 and S120 (S130).

Specifically, in the processing at step S130, the target air outlet temperature TAO is calculated using formula F1 below.

$$TAO = Kset \times Tset - Kr \times Tr - Kam \times Tam - Ks \times As + C \quad (F1)$$

where Tset is a target temperature of the vehicle interior set by a temperature setting switch, Tr is a detection signal detected by the inside-air sensor, Tam is a detection signal detected by the outside-air sensor, and As is a detection signal detected by the solar radiation sensor. Kset, Kr, Kam, and Ks are control gains; and C is a correction constant.

Subsequently, the air-conditioning controller 50 determines the blowing capacity of the blower 33 (S140). In the processing at step S140, when the automatic setting switch 60a is turned off, the air-conditioning controller 50 determines the blowing capacity of the blower 33 in accordance with the indication of the blown volume adjustment switch of the manual setting unit 60b.

Meanwhile, when the automatic setting switch 60a is turned on, the air-conditioning controller 50 determines the blowing capacity of the blower 33 based on the target air outlet temperature TAO calculated in step S130, with reference to the control map pre-stored in the storage unit.

Specifically, the air-conditioning controller 50 in this embodiment determines the blowing capacity of the blower 33 to be around the maximum capacity such that the volume of air blown from the blower 33 is increased when the target air outlet temperature TAO is in either an ultra-low temperature range or an ultra-high temperature range. Further, the air-conditioning controller 50 in this embodiment determines the blowing capacity of the blower 33 to be lower than around the maximum capacity such that a blowing volume from the blower 33 is decreased when the target air outlet temperature TAO either increases from the ultra-low temperature range to an intermediate temperature range or decreases from the ultra-high temperature range to the intermediate temperature range.

Subsequently, the air-conditioning controller 50 determines a suction port mode indicative of a switching state of the inside/outside air switch 32 (S150). In the processing at step S150, when the automatic setting switch 60a is turned off, the air-conditioning controller 50 determines the suction port mode in accordance with the suction setting switch of the manual setting unit 60b.

Meanwhile, when the automatic setting switch 60a is turned on, the air-conditioning controller 50 determines the suction port mode based on the target air outlet temperature TAO, with reference to the control map pre-stored in the storage unit. The air-conditioning controller 50 in this embodiment basically determines the suction port mode to be an outside air mode of introducing the outside air. The air-conditioning controller 50 in this embodiment determines the suction port mode to be an inside air mode of introducing the inside air, on the condition that the target air outlet temperature TAO is in the ultra-low temperature range and thereby a high air-cooling performance is required, on the condition that the target air outlet temperature TAO is in the ultra-high temperature range and thereby a high air-heating performance is required, and the like.

Subsequently, the air-conditioning controller 50 determines an air outlet mode (S160). In the processing at step S160, when the automatic setting switch 60a is turned off, the air-conditioning controller 50 determines the air outlet mode in accordance with the blowing setting switch of the manual setting unit 60b.

Meanwhile, when the automatic setting switch 60a is turned on, the air-conditioning controller 50 determines the air outlet mode based on the target air outlet temperature TAO, with reference to the control map pre-stored in the storage unit. The air-conditioning controller 50 in this embodiment determines the air outlet mode in such a manner as to shift from the foot mode to the bi-level mode and then the face mode in this order as the target air outlet temperature TAO is decreased from the high-temperature range to the low-temperature range.

Subsequently, the air-conditioning controller 50 determines an operation mode of the vehicle air conditioner 1 (S170). In the processing at step S170, when the automatic setting switch 60a is turned off, the air-conditioning controller 50 determines the operation mode to be one of the air-cooling mode, the dehumidification heating mode, and the air-heating mode in accordance with the operation mode switch of the manual setting unit 60b.

Meanwhile, when the automatic setting switch 60a is turned on, the air-conditioning controller 50 determines the operation mode based on various signals read in steps S110 and S120 and the target air outlet temperature TAO calculated in step S130.

Specifically, in the processing at step S170, the operation mode is determined to be the air-cooling mode of performing air-cooling of the vehicle interior, when the A/C switch is turned on and the target air outlet temperature TAO is lower than a pre-set air-cooling reference value. In the processing at step S170, the operation mode is determined to be the dehumidification heating mode of performing dehumidifying and air-heating of the vehicle interior, when the A/C switch is turned on and the target air outlet temperature TAO is equal to or higher than the air-cooling reference value. In the processing at step S170, the operation mode is determined to be the air-heating mode for the air-heating of the vehicle interior, when the A/C switch is turned off and the target air outlet temperature TAO is equal to or higher than an air-heating reference value.

Figures 5, 6, 7:
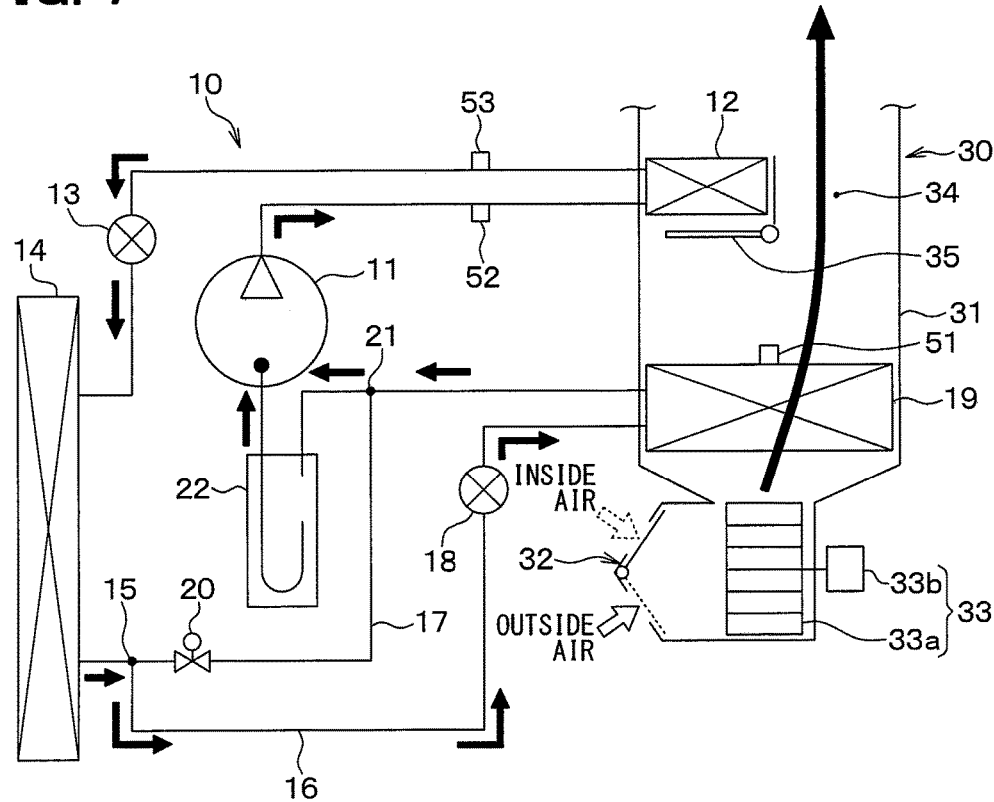
FIG. 5 is a diagram showing an opened/closed state of a low-pressure side on-off valve in each operation mode of the vehicle air conditioner according to the first embodiment.
FIG. 6 is a diagram showing opening degrees of respective expansion valves in each operation mode of the vehicle air conditioner according to the first embodiment.
FIG. 7 is a schematic configuration diagram showing the flow of a refrigerant in an air-cooling mode and a dehumidification heating mode of the vehicle air conditioner according to the first embodiment.

Subsequently, the air-conditioning controller 50 determines an opened/closed state of the low-pressure side on-off valve 20 based on the operation mode determined at step S170 (S180). As shown in FIG. 5, in the processing at step S180, the low-pressure side on-off valve 20 is determined to be brought into a closed state, when the operation mode is determined to be either the air-cooling mode or the dehumidification heating mode in the processing at step S170. In the processing at step S180, the low-pressure side on-off valve 20 is determined to be brought into an open state, when the operation mode is determined to be the air-heating mode in the processing at step S170.

Subsequently, the air-conditioning controller 50 determines the number of revolutions Nc of the compressor 11 based on various signals read in steps S110 and S120, the target air outlet temperature TAO calculated in step S130, and the operation mode determined in step S170 (S190).

In the processing at step S190, the number of revolutions Nc of the compressor 11 is determined as follows, when the operation mode is determined to be either the air-cooling mode or the dehumidification heating mode in the processing at step S170. In the processing at step S190, a target evaporator temperature TEO of the interior evaporator 19 is determined based on the target air outlet temperature TAO with reference to the control map pre-stored in the storage unit. The target evaporator temperature TEO is determined to be equal to or higher than a temperature (for example, 1° C.), which is higher than the frost formation temperature (for example, 0° C.), in order to prevent frost formation (i.e., frost) at the interior evaporator 19.

In the processing at step S190, the number of revolutions Nc of the compressor 11 is determined such that the evaporator temperature Te approaches the target evaporator temperature TEO based on a deviation between the target evaporator temperature TEO and the evaporator temperature Te detected by the first temperature sensor 51.

In the processing at step S190, the number of revolutions Nc of the compressor 11 is determined based on the discharge refrigerant pressure Ph, the target air outlet temperature TAO, and the discharge refrigerant temperature Th when the operation mode is determined to be the air-heating mode in the processing at step S9.

Specifically, in the processing at step S190, a target pressure Phd of the discharge refrigerant pressure Ph is determined based on the target air outlet temperature TAO and the discharge refrigerant pressure Ph detected by the refrigerant pressure sensor 53 with reference to the control map pre-stored in the storage unit. In the processing at step S190, the number of revolutions Nc of the compressor 11 is determined such that the discharge refrigerant pressure Ph approaches the target pressure Phd based on a deviation between the target pressure Phd and the discharge refrigerant pressure Ph.

Subsequently, the air-conditioning controller 50 determines an opening degree of each of the expansion valves 13 and 18 (S200). In the processing at step S200, as shown in FIG. 6, the first expansion valve 13 is determined to be in a fully open state, and the second expansion valve 18 is determined to be in a throttle state, when the operation mode is determined to be either the air-cooling mode or the dehumidification heating mode in the processing at step S170. A throttle opening degree of the second expansion valve 18 is determined such that a supercooling degree of the refrigerant flowing into the second expansion valve 18 approaches a target supercooling temperature. The target supercooling degree is determined such that a coefficient of performance of the cycle (i.e., COP) is substantially maximized, based on the discharge refrigerant temperature Th detected by the second temperature sensor 52 and the high-pressure refrigerant pressure Ph detected by the refrigerant pressure sensor 53 with reference to the control map pre-stored in the storage unit.

In the processing at step S200, the first expansion valve 13 is determined to be in a throttle state, and the second expansion valve 18 is determined to be in a completely closed state, when the operation mode is determined to be the air-heating mode in the processing at step S170. A throttle opening degree of the first expansion valve 13 is determined such that a supercooling degree of the refrigerant flowing into the first expansion valve 13 approaches the target supercooling temperature. The target supercooling degree is determined based on the detected value of the second temperature sensor 52 and the detected value of the refrigerant pressure sensor 53, like in the air-cooling mode or the like.

Subsequently, the air-conditioning controller 50 determines an opening degree of the air mix door 35 (S210). In the processing at step S210, during the air-cooling mode, the air-conditioning controller 50 determines the opening degree of the air mix door 35 such that the air mix door 35 closes an air passage for the interior condenser 12, and that the whole volume of the ventilation air having passed through the interior evaporator 19 passes through the cold-air bypass passage 34.

In the processing at step S210, during the dehumidification heating mode and the air-heating mode, the air-conditioning controller 50 determines the opening degree of the air mix door 35 such that the air mix door 35 closes the cold-air bypass passage 34, and that the whole volume of the ventilation air having passed through the interior evaporator 19 passes through the interior condenser 12.

Subsequently, the air-conditioning controller 50 outputs the control signals and the like determined in steps S140 to S210, to respective control target devices (S220). The normal air-conditioning processing performed in step S3 shown in FIG. 3 is controlled in the ways mentioned above. Thus, the refrigeration cycle device 10 operates in accordance with the operation mode selected in step S170 as follows.

(A) Air-Cooling Mode

In the air-cooling mode, the air-conditioning controller 50 operates the compressor 11 while setting the low-pressure side on-off valve 20 in the closed state, the first expansion valve 13 in the fully open state, and the second expansion valve 18 in the throttle state. Thus, as indicated by the arrows in FIG. 7, in the air-cooling mode, the refrigerant discharged from the compressor 11 flows through the interior condenser 12, the first expansion valve 13, the exterior heat exchanger 14, the second expansion valve 18, the interior evaporator 19, and the accumulator 22 in this order, and then is drawn into the compressor 11 again.

Specifically, in the air-cooling mode, the refrigerant discharged from the compressor 11 flows into the interior condenser 12. At this time, the air mix door 35 closes the air passage for the interior condenser 12, whereby the refrigerant flowing into the interior condenser 12 flows out of the interior condenser 12 almost without dissipating heat into the ventilation air.

Since the first expansion valve 13 is fully opened, the refrigerant flowing out of the interior condenser 12 flows into the exterior heat exchanger 14 almost without being decompressed by the first expansion valve 13. The refrigerant flowing into the exterior heat exchanger 14 dissipates its heat by exchanging heat with the outside air and thereby is cooled down to the target supercooling degree.

Since the low-pressure side on-off valve 20 is closed and the second expansion valve 18 is in the throttle state, the refrigerant flowing out of the exterior heat exchanger 14 flows into the second expansion valve 18 to be decompressed into a low-pressure refrigerant. The low-pressure refrigerant flowing out of the second expansion valve 18 flows into the interior evaporator 19 and absorbs heat from the ventilation air blown from the blower 33 to evaporate. In this way, the ventilation air is cooled and dehumidified.

The refrigerant flowing out of the interior evaporator 19 flows into the accumulator 22 to be separated into a gas phase refrigerant and a liquid phase refrigerant. The gas phase refrigerant separated by the accumulator 22 is drawn into the compressor 11 and then compressed again.

Here, the liquid phase refrigerant separated by the accumulator 22 is stored in the accumulator 22 as an excessive refrigerant that is not necessary for the refrigeration cycle device 10 to exhibit a required refrigeration capacity. The same goes for the dehumidification heating mode and the air-heating mode.

As mentioned above, in the air-cooling mode, the refrigerant dissipates its heat in the exterior heat exchanger 14, and the refrigerant is evaporated in the interior evaporator 19, thereby cooling the ventilation air to be blown into the vehicle interior. Thus, the air-cooling of the vehicle interior can be achieved.

(B) Dehumidification Heating Mode

In the dehumidification heating mode, the air-conditioning controller 50 operates the compressor 11 while setting the low-pressure side on-off valve 20 in the closed state, the first expansion valve 13 in the fully open state, and the second expansion valve 18 in the throttle state. Thus, in the dehumidification heating mode, the refrigerant flows in the same way as in the air-cooling mode, as indicated by the arrows in FIG. 7.

Specifically, in the dehumidification heating mode, the high-pressure refrigerant discharged from the compressor 11 flows into the interior condenser 12. At this time, the air mix door 35 fully opens the air passage for the interior condenser 12. Thus, the refrigerant flowing into the interior condenser 12 exchanges heat with the ventilation air having passed through the interior evaporator 19 to dissipate heat therefrom. In this way, the ventilation air is heated such that its temperature approaches the target air outlet temperature TAO.

The refrigerant flowing out of the interior condenser 12 flows into the exterior heat exchanger 14 via the first expansion valve 13 in the same way as in the air-cooling mode. The refrigerant flowing into the exterior heat exchanger 14 exchanges heat with the outside air to dissipate heat therefrom and thereby is cooled down to the target supercooling degree. Further, the refrigerant flowing out of the exterior heat exchanger 14 flows through the second expansion valve 18, the interior evaporator 19, the accumulator 22, and the compressor 11 in this order in the same way as in the air-cooling mode.

As mentioned above, in the dehumidification heating mode, the refrigerant dissipates its heat in the interior condenser 12 and the exterior heat exchanger 14, and is then evaporated in the interior evaporator 19, so that the ventilation air cooled and dehumidified in the interior evaporator 19 is heated in the interior condenser 12. Thus, the dehumidification heating of the vehicle interior can be achieved.

(C) Air-Heating Mode

In the air-heating mode, the air-conditioning controller 50 operates the compressor 11 while setting the low-pressure side on-off valve 20 in the open state, the first expansion valve 13 in the throttle state, and the second expansion valve 18 in the completely closed state. Thus, as indicated by the arrows in FIG. 8, in the air-heating mode, the refrigerant discharged from the compressor 11 flows through the interior condenser 12, the first expansion valve 13, the exterior heat exchanger 14, and the accumulator 22 in this order, and then is drawn into the compressor 11 again.

Specifically, in the air-heating mode, the high-pressure refrigerant discharged from the compressor 11 flows into the interior condenser 12. At this time, the air mix door 35 fully opens the air passage for the interior condenser 12. Thus, the refrigerant flowing into the interior condenser 12 exchanges heat with the ventilation air having passed through the interior evaporator 19 to dissipate heat therefrom. In this way, the ventilation air is heated such that its temperature approaches the target air outlet temperature TAO.

Since the first expansion valve 13 is in the throttle state, the refrigerant flowing out of the interior condenser 12 flows into the first expansion valve 13 to be decompressed into a low-pressure refrigerant. The low-pressure refrigerant flowing out of the first expansion valve 13 flows into the exterior heat exchanger 14. The refrigerant flowing into the exterior heat exchanger 14 is evaporated by heat exchange with the outside air.

Since the low-pressure side on-off valve 20 is opened and the second expansion valve 18 is completely closed, the refrigerant flowing out of the exterior heat exchanger 14 flows into the accumulator 22 to be separated into a gas phase refrigerant and a liquid phase refrigerant. The gas phase refrigerant separated by the accumulator 22 is drawn into the compressor 11 and then compressed again.

As mentioned above, in the air-heating mode, the refrigerant dissipates its heat in the interior condenser 12, and the refrigerant is evaporated in the exterior heat exchanger 14, so that the ventilation air having passed through the interior evaporator 19 is heated in the interior condenser 12. Thus, the air-heating of the vehicle interior can be achieved.

Returning to FIG. 3, the air-conditioning controller 50 performs the normal air-conditioning processing in step S3, and then determines whether the air-conditioning processing is to be finished or not (S4). Specifically, in the determination processing at step S4, it is determined whether or not an operation stop request for the vehicle air conditioner 1 is made through the operation panel 60.

Consequently, when it is determined that the air-conditioning processing is to be finished, the air-conditioning controller 50 finishes the air-conditioning processing by stopping the operations of the respective control target devices. Meanwhile, when the air-conditioning processing is determined not to be finished, the air-conditioning controller 50 continuously executes the normal air-conditioning processing.

Next, a description will be given on a case where the operation mode is determined to be the pre-air-conditioning in the determination processing at step S2. When the operation mode is determined to be the pre-air-conditioning in the determination processing at step S2, the air-conditioning controller 50 executes the charged-amount determination processing (S5).

The charged-amount determination processing is processing that involves determining whether or not the refrigeration cycle device is in the refrigerant shortage state where the charged amount of the refrigerant in the cycle is insufficient. The concept of the method to determine the refrigerant shortage state in the charged-amount determination processing in this embodiment will be described before explaining the specific contents of the charged-amount determination processing.

First of all, in the normal state where the charged amount of the refrigerant in the cycle is sufficient, the heat dissipation capacity of the interior condenser 12 tends to increase when the throttle opening degree of the first expansion valve 13 as the decompression device is decreased while the compressor 11 is being operated.

Here, the discharge refrigerant pressure Ph has a correlation with the heat dissipation capacity of the interior condenser 12. Specifically, the discharge refrigerant pressure Ph is raised as the heat dissipation capacity in the interior condenser 12 is increased.

Figure 9:
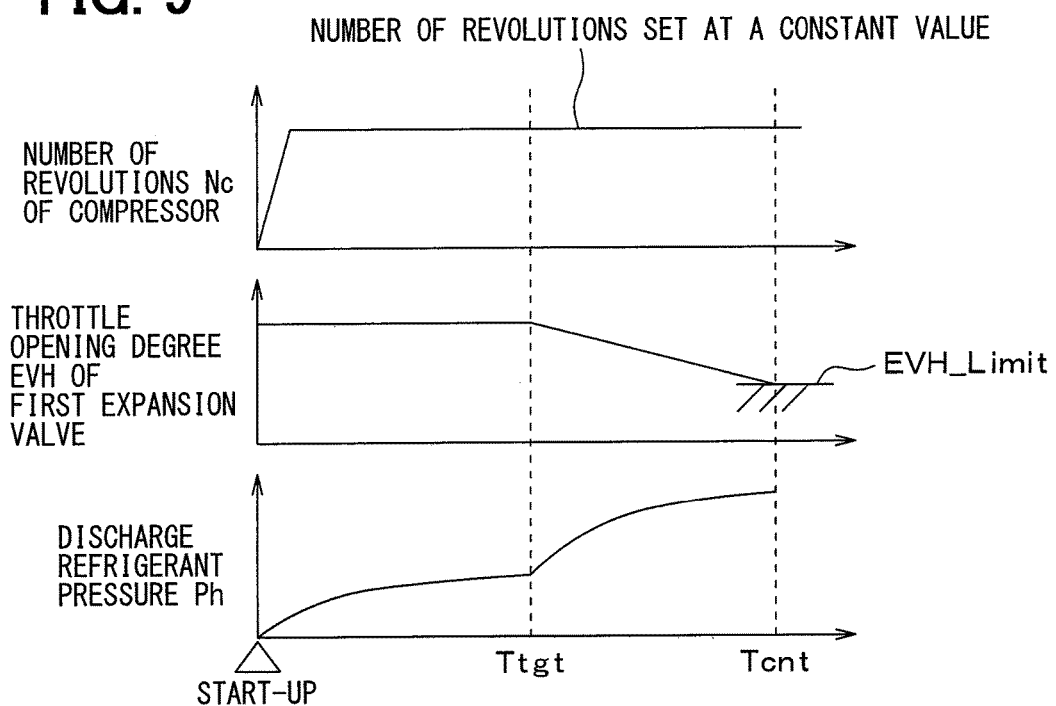
FIG. 9 is a graph showing a change in the discharge refrigerant pressure in executing charged-amount determination processing when the charged amount of a refrigerant is appropriate.

Thus, in the normal state where the charged amount of the refrigerant in the cycle is sufficient, as shown in FIG. 9, the discharge refrigerant pressure Ph is raised when a throttle opening degree EVH of the first expansion valve 13 as the decompression device is gradually decreased while the number of revolutions Nc of the compressor 11 or the like is maintained at a certain value.

Meanwhile, in the refrigerant shortage state where the charged amount of the refrigerant in the cycle is insufficient, when the throttle opening degree EVH of the first expansion valve 13 as the decompression device is decreased while the compressor 11 is being operated, the heat dissipation capacity of the interior condenser 12 tends to decrease at one throttle opening degree or less.

Figure 10:
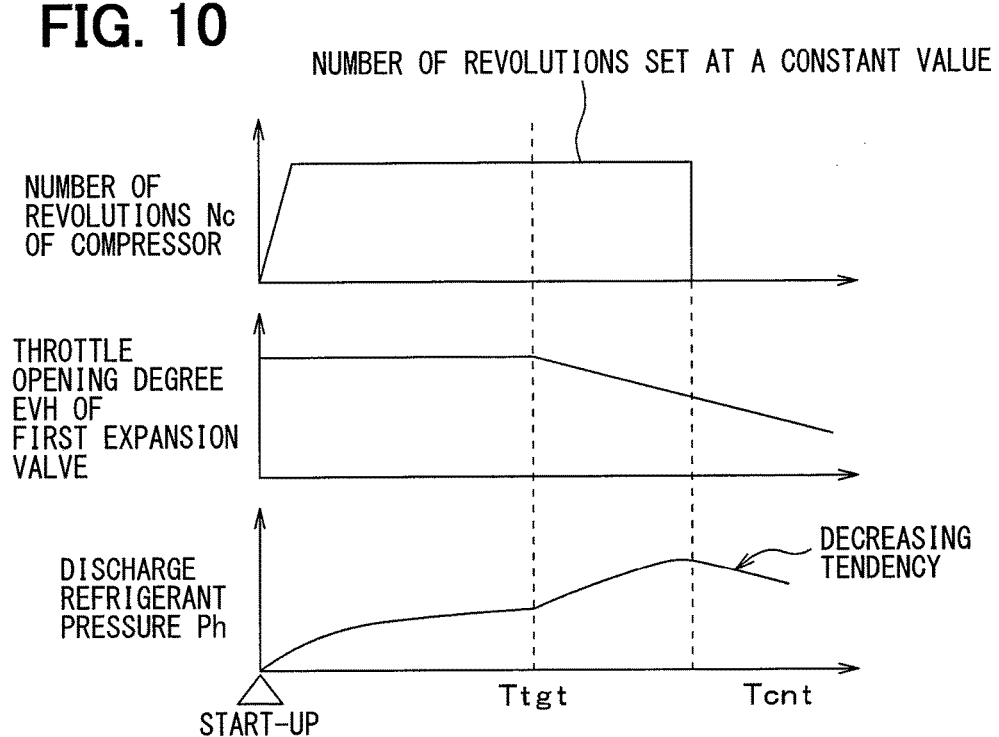
FIG. 10 is a graph showing a change in the discharge refrigerant pressure in executing charged-amount determination processing when the charged amount of a refrigerant is insufficient.

Thus, in the refrigerant shortage state where the charged amount of the refrigerant in the cycle is insufficient, as shown in FIG. 10, the discharge refrigerant pressure Ph is reduced at one throttle opening or less when the throttle opening degree EVH of the first expansion valve 13 as the decompression device is gradually decreased while the number of revolutions Nc of the compressor 11 or the like is maintained at a constant value.

This point will be described in detail below. In the following, for convenience of explanation, the vehicle air conditioner 1 is set at the refrigerant circuit and the air flow path in the air-heating mode.

Figure 11:
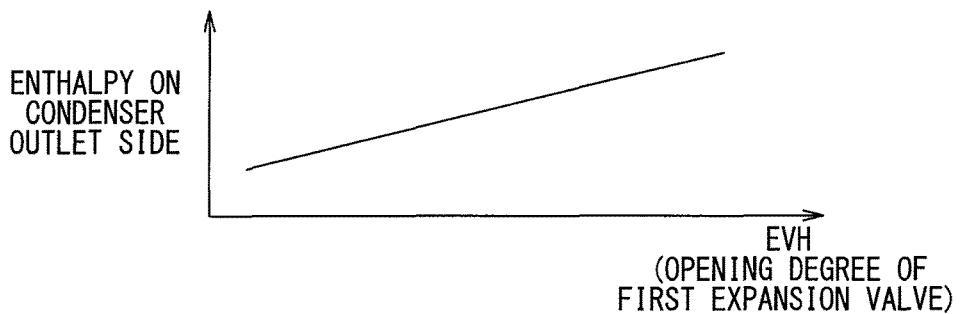
FIG. 11 is a property diagram showing a correlation property between a throttle opening degree of a first expansion valve and an enthalpy on an outlet side of the condenser.
Figure 12:
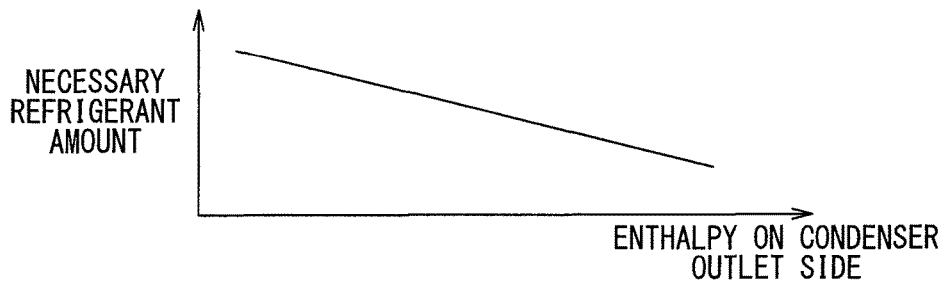
FIG. 12 is a property diagram showing a relationship between the enthalpy on the outlet side of the condenser and a necessary refrigerant amount in the refrigeration cycle device.

First, when the throttle opening degree EVH of the first expansion valve 13 is gradually decreased while the compressor 11 is being operated, as shown in FIG. 11, the enthalpy on the side of the refrigerant outlet of the interior condenser 12 decreases. Thus, the amount of refrigerant stored in the interior condenser 12 is increased. Then, when the enthalpy on the side of the refrigerant outlet of the interior condenser 12 decreases and the amount of the refrigerant held in the interior condenser 12 increases, as shown in FIG. 12, the necessary refrigerant amount, required for the cycle, is increased.

At this time, in the normal state where the charged amount of the refrigerant in the cycle is sufficient, the excess refrigerant is stored in the accumulator 22. Thus, in the normal state, the superheat degree SH (i.e., superheat) of the refrigerant drawn into the compressor 11 hardly changes even when the throttle opening degree EVH of the first expansion valve 13 is decreased.

In this way, the amount of heat absorption in the exterior heat exchanger 14, serving as an evaporator, is increased in the normal state in accordance with the decrease in the enthalpy on the side of the refrigerant outlet of the interior condenser 12. Consequently, as the heat dissipation capacity of the interior condenser 12 increases, the discharge refrigerant pressure Ph is also raised.

Figure 13:
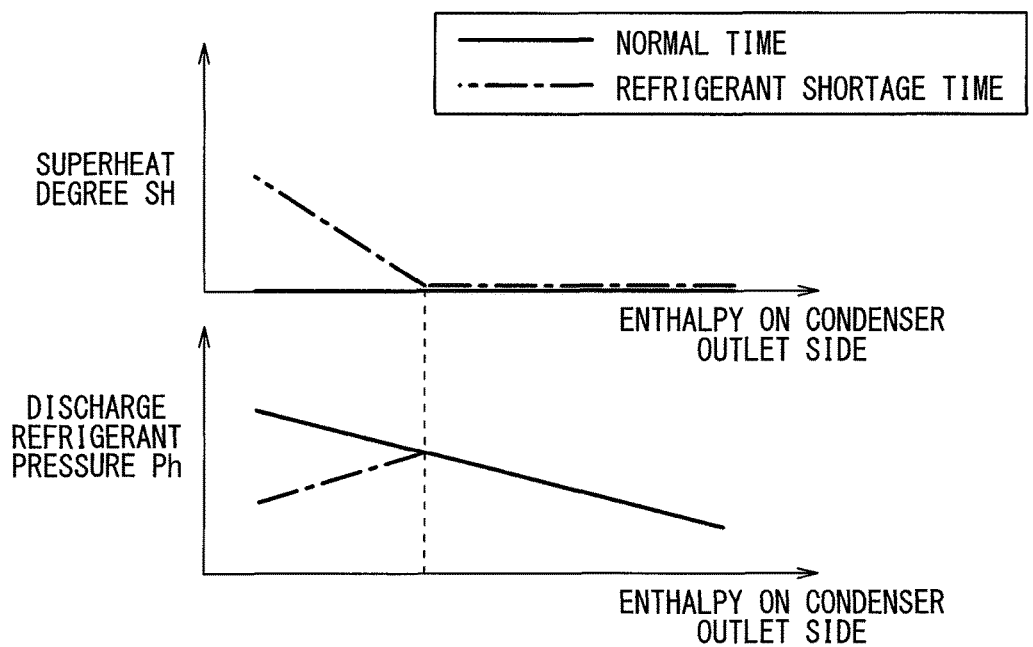
FIG. 13 is a graph showing changes in the superheat degree and the discharge refrigerant pressure with respect to the enthalpy on the outlet side of the condenser in executing the charged-amount determination processing when the charged amount of the refrigerant is insufficient.

In contrast, in the refrigerant shortage state where the charged amount of the refrigerant in the cycle is insufficient, there is almost no excess refrigerant in the accumulator 22. Thus, when the throttle opening degree EVH of the first expansion valve 13 is decreased in the refrigerant shortage state, as shown in FIG. 13, the excessive refrigerant in the accumulator 22 is eliminated at one throttle opening. As a result, the superheat degree SH (i.e., superheat) occurs in the suction refrigerant, drawn into the compressor 11.

Thus, in the refrigerant shortage state, when the throttle opening degree EVH of the first expansion valve 13 is decreased, the flow rate of the refrigerant drawn into the compressor 11 is decreased at one throttle opening degree. Consequently, as the heat dissipation capacity of the interior condenser 12 decreases, the discharge refrigerant pressure Ph is reduced.

In this way, the refrigeration cycle device 10 exhibits the behavior that differs between the normal state in which the charged amount of the refrigerant in the cycle is sufficient and the refrigerant shortage state in which the charged amount thereof is insufficient.

Based on the above-mentioned thought, the charged-amount determination processing in this embodiment determines the refrigeration cycle device to be in the refrigerant shortage state in a case where the heat dissipation capacity of the interior condenser 12 shows the tendency to decrease when the throttle opening degree EVH of the first expansion valve 13 is decreased while the compressor 11 is being operated.

Next, the specific contents of the charged-amount determination processing executed by the air-conditioning controller 50 in step S5 will be described using the flowchart of FIG. 14.

Figure 14:
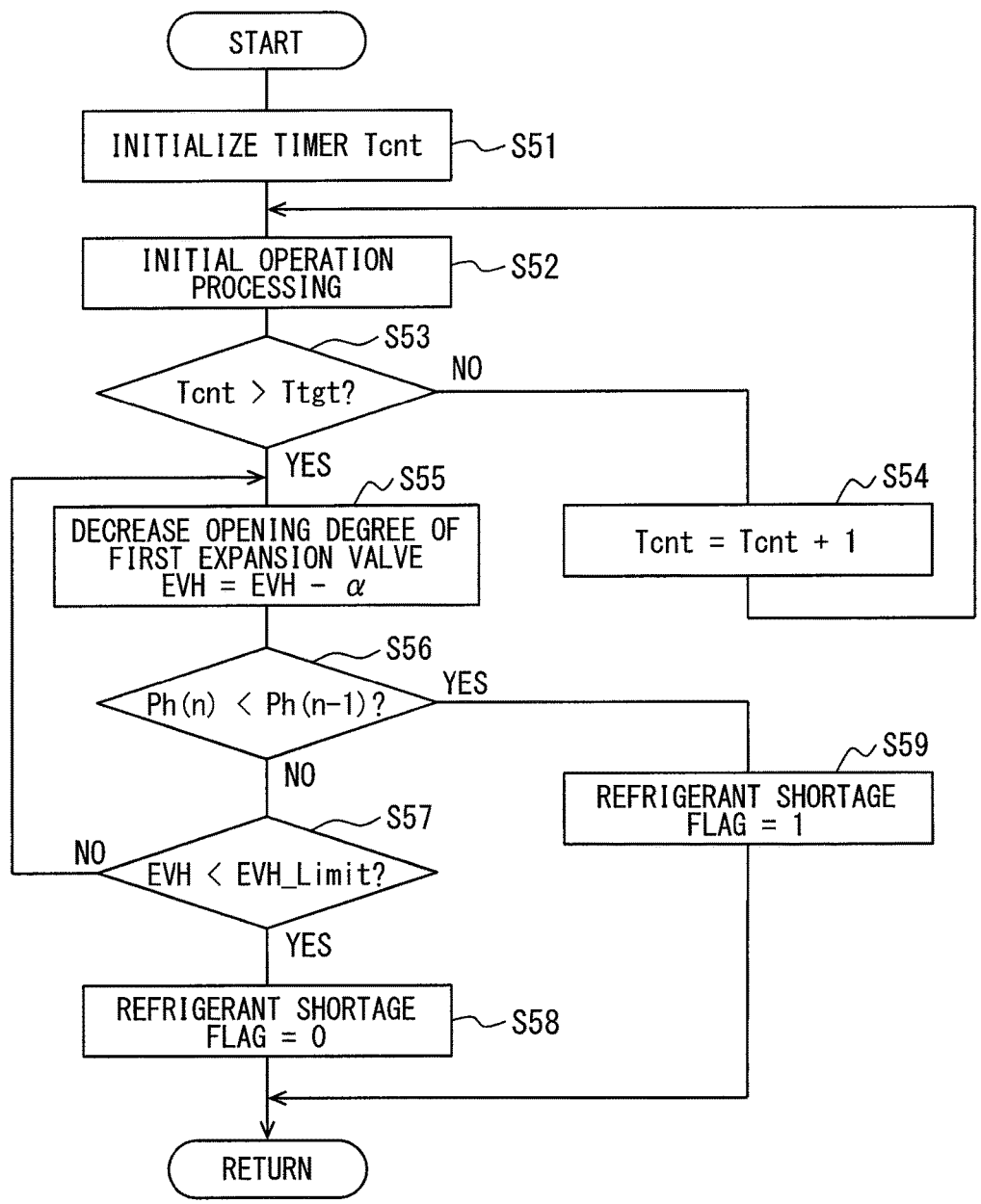
FIG. 14 is a flowchart showing the flow of the charged-amount determination processing executed by the air-conditioning controller according to the first embodiment.

As shown in FIG. 14, first, the air-conditioning controller 50 initializes a timer Tcnt for measuring an elapsed time after the start of the charged-amount determination processing (S51). Specifically, the timer Tcnt is set at zero (Tcnt=0).

Subsequently, the air-conditioning controller 50 executes initial operation processing in which the refrigeration cycle device 10 is started up in a predetermined operation mode, while the interior air-conditioning unit 30 is started at a predetermined suction port mode and a predetermined air outlet mode (S52).

Figure 8:
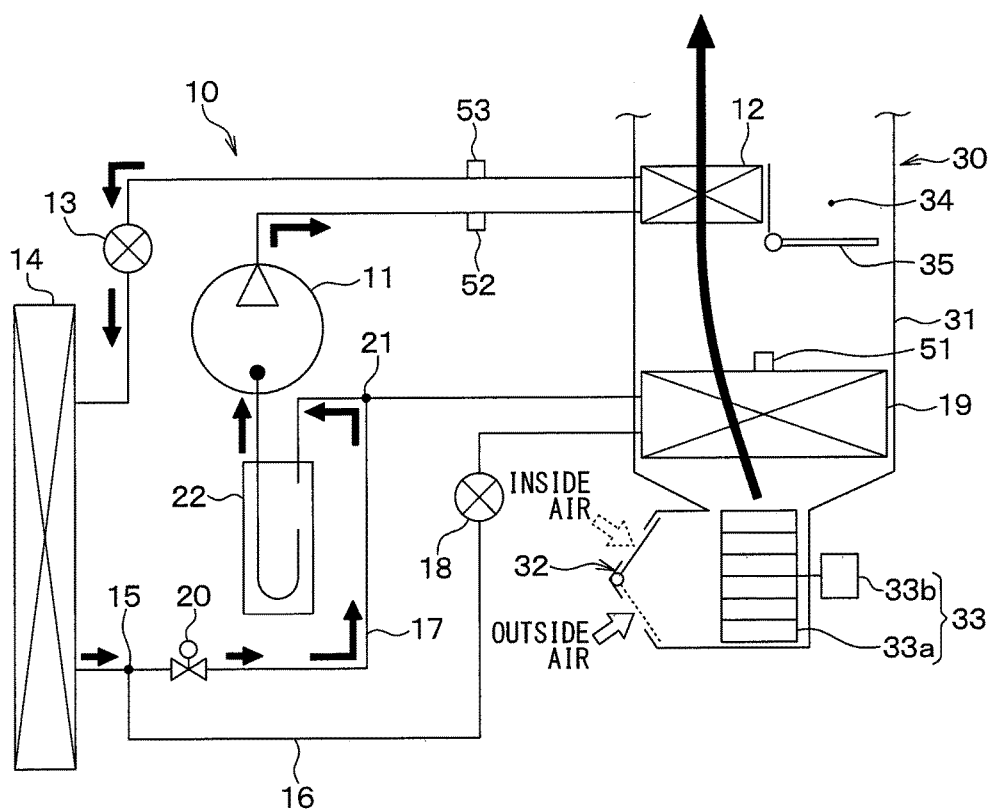
FIG. 8 is a schematic configuration diagram showing the flow of a refrigerant in an air-heating mode of the vehicle air conditioner according to the first embodiment.

As shown in FIG. 8, in the initial operation processing of this embodiment, the low-pressure side on-off valve 20 and the respective expansion valves 13 and 18 are controlled such that the refrigeration cycle device 10 takes the refrigeration circuit in the air-heating mode. During the initial operation processing, the throttle opening degree EVH of the first expansion valve 13 is maintained at a prescribed opening degree (that is, a fixed opening degree).

Further, as shown in FIG. 8, in the initial operation processing of this embodiment, the air mix door 35 is controlled such that the interior air-conditioning unit 30 takes the air flow path in the air-heating mode. During the initial operation processing, the suction port mode is set at the outside air mode, and the air outlet mode is set at the foot mode.

In the initial operation processing, the compressor 11 is operated at the reference number of revolutions (that is, the fixed number of revolutions) individually pre-set. Further, each of the blower 33 and the exterior fan 14a is operated at the reference number of revolutions (that is, the fixed number of revolutions) individually pre-set.

Subsequently, the air-conditioning controller 50 determines whether or not a predetermined time period has elapsed or not after the start of the initial operation processing. Specifically, the air-conditioning controller 50 determines whether or not a time indicated by the timer Tcnt exceeds a prescribed target time Ttgt (S53). The target time Ttgt is set to be longer than a necessary stabilization time, which is required for the pressure state (for example, the discharge refrigerant pressure Ph) in the cycle to be stabilized at a certain pressure after the operation of the compressor 11 is started.

When the time indicated by the timer Tcnt is determined not to exceed the target time Ttgt as a result of the determination processing in step S53, the pressure state (for example, the discharge refrigerant pressure Ph) in the cycle is considered not to be stabilized. Thus, the air-conditioning controller 50 updates the timer Tcnt by adding "1" to the time indicated by the timer Tcnt (Tcnt=Tcnt+1) (S54).

When the time indicated by the timer Tcnt is determined to exceed the target time Ttgt as a result of the determination processing in step S53, the pressure state (for example, the discharge refrigerant pressure Ph) in the cycle is considered to be stabilized.

Thus, when the time indicated by the timer Tcnt is determined to exceed the target time Ttgt in the determination processing at step S53, the air-conditioning controller 50 decreases the throttle opening degree EVH of the first expansion valve 13 (S55). Specifically, in the processing at step S55, a target opening is set at a value obtained by subtracting a predetermined opening degree a from the current throttle opening degree EVH, and then the first expansion valve 13 is controlled to have its opening degree approach the above-mentioned target opening degree.

Subsequently, the air-conditioning controller 50 determines whether or not the discharge refrigerant pressure Ph shows the tendency to decrease when decreasing the throttle opening degree EVH of the first expansion valve 13. Specifically, it is determined whether or not a currently-detected discharge refrigerant pressure Ph(n), detected by the refrigerant pressure sensor 53, is smaller than a previously-detected discharge refrigerant pressure Ph(n−1) (S56).

Consequently, when the discharge refrigerant pressure Ph(n) is determined not to be smaller than the discharge refrigerant pressure Ph(n−1), the air-conditioning controller 50 determines whether or not the throttle opening degree EVH of the first expansion valve 13 is smaller than a preset lower limit of the determination opening degree EVH_Limit (S57). The lower limit of the determination opening degree EVH_Limit is set at around the minimum opening degree of the throttle opening degree EVH of the first expansion valve 13.

When the throttle opening degree EVH of the first expansion valve 13 is determined not to be smaller than the lower limit of the determination opening degree EVH_Limit as a result of the determination processing at step S57, the air-conditioning controller 50 returns to step S55, in which the throttle opening degree EVH of the first expansion valve 13 is decreased.

Meanwhile, when the throttle opening degree EVH of the first expansion valve 13 is determined to be smaller than the lower limit of the determination opening degree EVH_Limit as a result of the determination processing at step S57, the heat dissipation capacity of the interior condenser 12 does not show the tendency to decrease when the throttle opening degree EVH of the first expansion valve 13 is decreased.

That is, when the throttle opening degree EVH of the first expansion valve 13 is determined to be smaller than the lower limit of the determination opening degree EVH_Limit in the determination processing at step S57, the refrigeration cycle device can be determined to be in the normal state where the charged amount of the refrigerant in the cycle is sufficient. Thus, the air-conditioning controller 50 in this embodiment sets a refrigerant shortage flag at "0" (S58), when the throttle opening degree EVH of the first expansion valve 13 is determined to be smaller than the lower limit of the determination opening degree EVH_Limit in the determination processing at step S57. Then, the air-conditioning controller 50 stores a set value of the refrigerant shortage flag in the storage unit and then finishes the charged-amount determination processing.

The refrigerant shortage flag is a flag which indicates either the normal state, in which the charged amount of the refrigerant in the cycle is sufficient, or the refrigerant shortage state, in which the charged amount thereof is insufficient. In this embodiment, the refrigerant shortage flag is set at "0" in the normal state where the charged amount of the refrigerant in the cycle is sufficient and at "1" in the refrigerant shortage state.

Subsequently, when the current discharge refrigerant pressure Ph(n) is determined to be lower than the previous discharge refrigerant pressure Ph(n−1) as a result of the determination processing in step S56, the heat dissipation capacity of the interior condenser 12 shows the tendency to decrease when the throttle opening degree EVH of the first expansion valve 13 is decreased.

That is, when the current discharge refrigerant pressure Ph(n) is determined to be lower than the previous discharge refrigerant pressure Ph(n−1) in the determination processing at step S56, it can be determined that the refrigeration cycle device is in the refrigerant shortage state. Thus, when the current discharge refrigerant pressure Ph(n) is determined to be lower than the previous discharge refrigerant pressure Ph(n−1) as a result of the determination processing at step S56, the air-conditioning controller 50 in this embodiment sets a refrigerant shortage flag at "1" (S59). Then, the air-conditioning controller 50 stores a set value of the refrigerant shortage flag in the storage unit and then finishes the charged-amount determination processing.

The charged-amount determination processing shown in step S5 of FIG. 3 has been described above. Returning to FIG. 3, after execution of the charged-amount determination processing shown in step S5, the air-conditioning controller 50 determines whether the refrigerant shortage flag is set at "1" or not (S6).

Consequently, when the refrigerant shortage flag is determined not to be set at "1", the refrigeration cycle device is in the normal state where the charged amount of the refrigerant in the cycle is sufficient. Thus, the air-conditioning controller 50 executes the pre-air-conditioning processing (S7). In the pre-air-conditioning processing, the same control processing as the normal air-conditioning processing shown in the step S3 of FIG. 3 is executed with the automatic setting switch 60a turned on.

The air-conditioning controller 50 executes the pre-air-conditioning processing in step S7 and then determines whether the air-conditioning processing is to be finished or not (S8). Specifically, in the determination processing at step S8, whether an operation stop request for the vehicle air conditioner 1 is made or not through the operation panel 60 or the like, as well as whether the interior air-conditioning is completed or not are determined.

Consequently, when it is determined that the air-conditioning processing is to be finished, the air-conditioning controller 50 finishes the air-conditioning processing by stopping the operations of the respective control target devices. Meanwhile, when it is determined that the air-conditioning processing is not to be finished, the air-conditioning controller 50 continuously executes the pre-air-conditioning processing.

In contrast, when the refrigerant shortage flag is determined to be set at "1" as a result of the determination processing in step S6, the air-conditioning controller 50 executes abnormality handling processing (S9). In the abnormality handling processing, the compressor 11 is stopped, and the informing unit 70 informs the occupant that the refrigeration cycle device is in the refrigerant shortage state.

To eliminate the refrigerant shortage state, it is necessary to replenish the refrigeration cycle device 10 with a refrigerant. Thus, it is desirable to prohibit the operation of the compressor 11 until the refrigeration cycle device 10 is replenished with the refrigerant.

The refrigeration cycle device 10 in this embodiment, mentioned above, is configured to determine whether it is in the refrigerant shortage state or not based on a change in the heat dissipation capacity of the interior condenser 12 when the throttle opening degree EVH of the first expansion valve 13 as the decompression device is decreased during the operation of the compressor 11.

With this arrangement, it is possible to appropriately determine whether the refrigeration cycle device is in the refrigerant shortage state or not, regardless of the temperature of an external environment and the properties of the refrigerant. In particular, the control processing, such as that in this embodiment, is less affected by disturbance, in other words, has a high level of the so-called robustness. Such control processing is suitable for the vehicle air conditioner 1 to be used under the condition where the external environment significantly changes or the like.

Here, in the refrigerant shortage state, the superheat degree SH occurs in the suction refrigerant drawn into the compressor 11, when the throttle opening degree EVH of the first expansion valve 13 is decreased while the compressor 11 is being operated. Thus, it is also possible to determine whether or not the refrigeration cycle device is in the refrigerant shortage state based on the superheat degree SH caused when the throttle opening degree of the first expansion valve 13 is decreased while the compressor 11 is being operated To detect the superheat degree SH, it is necessary to further add a pressure sensor and a temperature sensor on the low-pressure side of the cycle, which might lead to an increase in cost of the refrigeration cycle device 10.

In contrast, the refrigeration cycle device 10 in this embodiment is configured to determine whether the refrigeration cycle device is in the refrigerant shortage state or not, based on a change in the discharge refrigerant pressure Ph detected by the refrigerant pressure sensor 53, when the throttle opening degree EVH of the first expansion valve 13 is decreased while the compressor 11 is being operated. The use of the detected value of the existing refrigerant pressure sensor 53 in this way does not need to add another sensor, which does not lead to an increase in the cost of the refrigeration cycle device 10.

The heat dissipation capacity of the interior condenser 12 also has a correlation with the temperature of the interior condenser 12. Thus, in the charged-amount determination processing, it is also possible to determine whether or not the refrigeration cycle device is in the refrigerant shortage state, based on a change in the temperature of the interior condenser 12 when the throttle opening degree EVH of the first expansion valve 13 is decreased while the compressor 11 is being operated.

However, uneven temperature distribution is more likely to occur in the interior condenser 12 because the enthalpy on the side of the refrigerant outlet of the interior condenser 12 is reduced when decreasing the throttle opening degree EVH of the first expansion valve 13. Such uneven temperature distribution might affect the accuracy of determination about whether the refrigeration cycle device is in the refrigerant shortage state or not.

In contrast, the configuration of this embodiment is one to determine whether to be in the refrigerant shortage state or not based on the discharge refrigerant pressure Ph, which is less likely to cause the uneven distribution, such as that of the temperature in the interior condenser 12. Thus, the configuration of this embodiment can more appropriately determine whether the refrigeration cycle device is in the refrigerant shortage state or not.

When the operation mode or the like of the refrigeration cycle device 10 is changed by an occupant's operation of the manual setting unit 60b, the heat dissipation capacity of the interior condenser 12 might vary unintentionally. Furthermore, while traveling of the vehicle, the volume of air flowing into the exterior heat exchanger 14 changes, and thereby the heat dissipation capacity of the interior condenser 12 might vary unintentionally.

By taking into account these matters, in this embodiment, the refrigeration cycle device is configured to execute the charged-amount determination processing in the pre-air-conditioning while no occupant is on the vehicle. Thus, it is possible to more appropriately determine whether the refrigeration cycle device is in the refrigerant shortage state or not based on a change in the heat dissipation capacity of the interior condenser 12 when decreasing the throttle opening degree EVH of the first expansion valve 13 as the decompression device.

This embodiment executes the abnormal handling processing to stop the compressor 11 when the refrigeration cycle device is determined to be in the refrigerant shortage state by the charged-amount determination processing. Thus, the compressor 11 is stopped in the refrigerant shortage state, thereby making it possible to ensure the reliability of the compressor 11.

When the charged-amount determination processing determines the refrigerant cycle device to be in the refrigerant shortage state, this embodiment is configured to execute the abnormal handling processing to inform an occupant of the refrigerant shortage state. This embodiment enables the user to appropriately recognize that the refrigeration cycle device is in the refrigerant shortage state.

This embodiment has explained the example in which the refrigeration cycle device 10 according to the present disclosure is used in the vehicle air conditioner 1 that is capable of switching between automatic air-conditioning and manual air-conditioning by an operation of the operation panel 60. However, the present disclosure is not limited thereto. The refrigeration cycle device 10 according to the present disclosure can also be used in a vehicle air conditioner 1 that does not have a function of executing the automatic air-conditioning.

Further, this embodiment has explained the example in which the air-conditioning controller 50 executes the pre-air-conditioning when receiving a signal for requesting the start of the pre-air-conditioning from the wireless terminal 90. However, the present disclosure is not limited thereto. The air-conditioning controller 50 may be configured to execute the pre-air-conditioning, for example, when a start time of the pre-air-conditioning, preset by a user or the like, is reached.

Second Embodiment

Next, a second embodiment will be described with reference to FIG. 15. This embodiment differs from the first embodiment in that the charged-amount determination processing is executed in the automatic air-conditioning.

In the description of the first embodiment, the charged-amount determination processing is executed when performing the air-conditioning of the vehicle interior through the pre-air-conditioning by way of example. Generally, the pre-air-conditioning is more likely to be performed at times when the temperature of the vehicle interior deviates significantly from a comfortable temperature, such as in winter or summer.

Meanwhile, when the temperature of the vehicle interior is close to the comfortable temperature, the pre-air-conditioning would be less likely to be performed. That is, when the pre-air-conditioning timing is defined as the timing of execution of the charged-amount determination processing, the number of execution of the charged-amount determination processing would be lessened.

For this reason, the air-conditioning controller 50 in this embodiment executes the charged-amount determination processing when performing the vehicle-interior air-conditioning through the automatic air-conditioning. The flow of the air-conditioning control processing executed by the air-conditioning controller 50 in this embodiment will be described with reference to a flowchart shown in FIG. 15.

Figure 15:
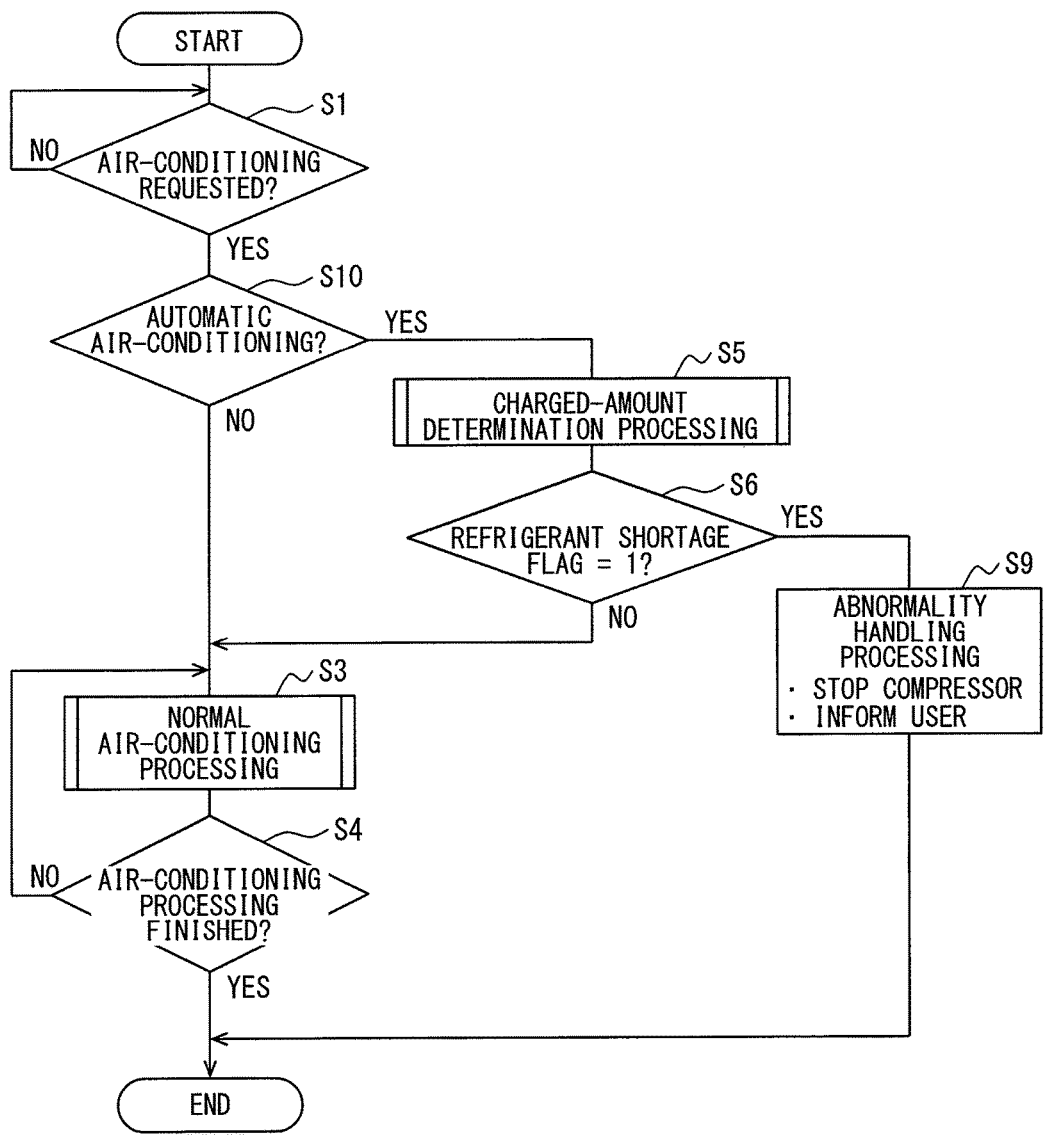
FIG. 15 is a flowchart showing the flow of air-conditioning control processing executed by the air-conditioning controller according to a second embodiment.

As shown in FIG. 15, in the air-conditioning control processing of this embodiment, when the air-conditioning of the vehicle interior is determined to be requested in the determination processing at step S1, the air-conditioning controller 50 determines whether or not the request for air-conditioning of the vehicle interior is intended for the automatic air-conditioning (S10). Specifically, in the determination processing at step S10, it is determined whether the automatic setting switch 60a is turned on or not.

When the request for air-conditioning of the vehicle interior is determined not to be intended for the automatic air-conditioning as a result of the determination processing in step S10, the air-conditioning controller 50 executes the normal air-conditioning processing (S3). The contents of the normal air-conditioning processing at step S3 are the same as those in the first embodiment and thus a description thereof will be omitted.

Meanwhile, when the request for the air-conditioning of the vehicle interior is determined to be intended for the automatic air-conditioning as a result of the determination processing at step S10, the air-conditioning controller 50 executes the charged-amount determination processing (S5). The contents of the charged-amount determination processing at step S5 are the same as those in the first embodiment and thus a description thereof will be omitted.

The contents of other air-conditioning control processing are the same as those in the first embodiment. The refrigeration cycle device 10 in this embodiment can obtain the functions and effects exhibited by the components common to those in the first embodiment, in the same manner as in the first embodiment.

In particular, the refrigeration cycle device 10 in this embodiment is configured to execute the charged-amount determination processing in the automatic air-conditioning. Thus, the refrigeration cycle device 10 in this embodiment can appropriately determine whether the refrigeration cycle device is in the refrigerant shortage state or not, even when the temperature of the vehicle interior is close to the comfortable temperature.

In the description of this embodiment, the charged-amount determination processing is executed in the automatic air-conditioning by way of example. However, the present disclosure is not limited thereto. For example, the charged-amount determination processing may be executed in the pre-air-conditioning, in addition to the automatic air-conditioning.

In the configuration that executes the charged-amount determination processing in the automatic air-conditioning, such as that in this embodiment, the heat dissipation capacity of the interior condenser 12 might vary unintentionally because the volume of air flowing into the exterior heat exchanger 14 changes while the vehicle is traveling. Thus, the charged-amount determination processing is desirably executed when the vehicle is stopped during the automatic air-conditioning.

Third Embodiment

Next, a third embodiment will be described with reference to FIG. 16. This embodiment differs from the first embodiment in that the charged-amount determination processing is executed when performing the normal air-conditioning.

The air-conditioning controller 50 in this embodiment executes the charged-amount determination processing when performing the normal air-conditioning processing. The flow of the air-conditioning control processing executed by the air-conditioning controller 50 in this embodiment will be described with reference to a flowchart shown in FIG. 16.

Figure 16:
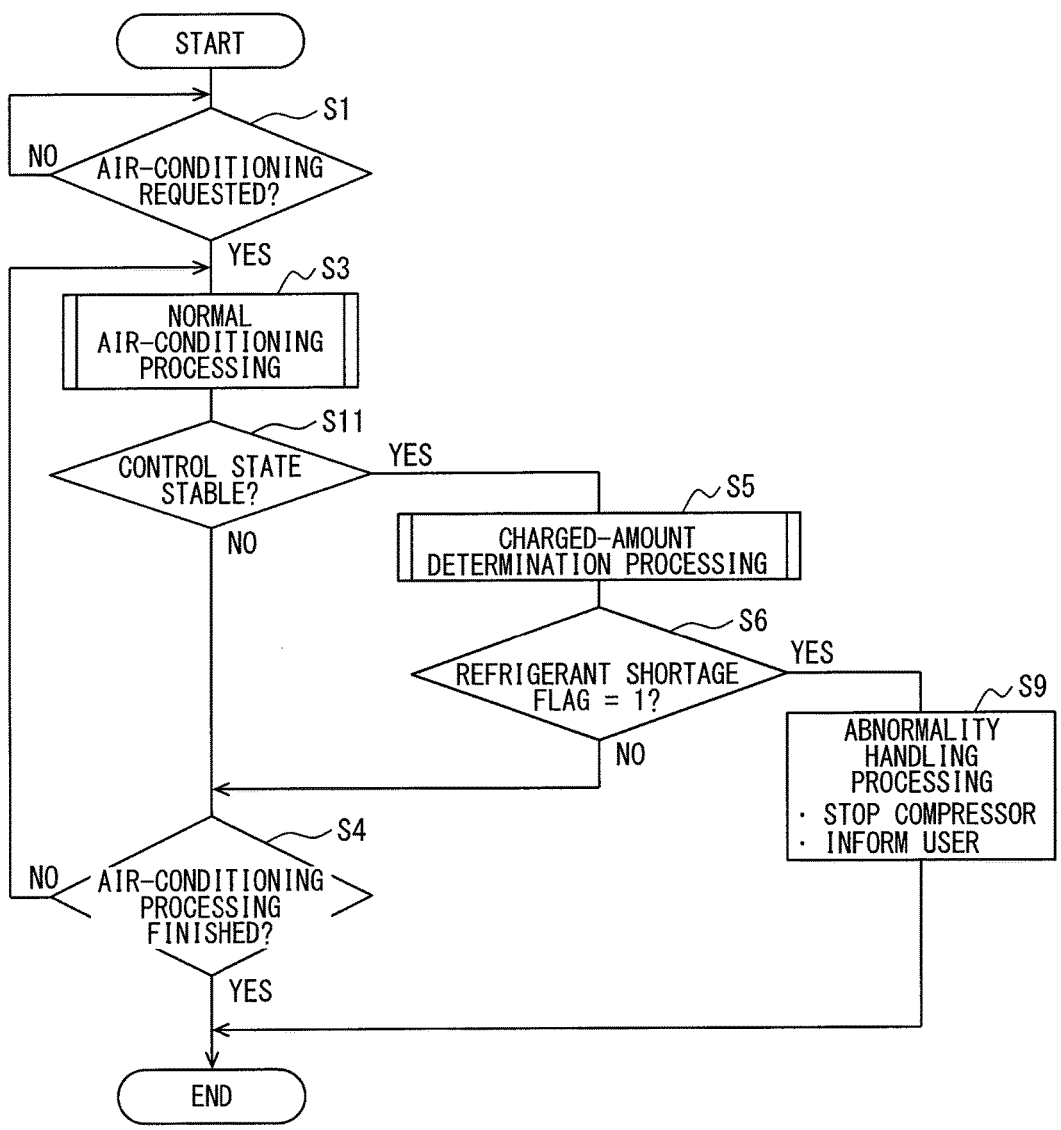
FIG. 16 is a flowchart showing the flow of air-conditioning control processing executed by the air-conditioning controller according to a third embodiment.

As shown in FIG. 16, in the air-conditioning control processing of this embodiment, after execution of the normal air-conditioning processing at step S3, the air-conditioning controller 50 determines whether the control state of each of various control target devices is stable or not (S11). Specifically, in the processing at step S11, it is determined whether or not the control signal output to each of various control target devices is maintained at a certain level.

For example, in the determination processing at step S11, the control states of the respective control target devices are determined to be stable when the target air outlet temperature TAO converges to around a given temperature and the setting of the operation mode or the like is maintained to be constant for a predetermined period of time.

In the determination processing at step S11, the control states of the respective control target devices are determined not to be stable when the target air outlet temperature TAO does not converge to around the given temperature, or when the setting of the operation mode or the like is switched in the predetermined period of time.

When the control states of the respective control target devices are determined not to be stable as a result of the determination processing at step S11, the air-conditioning controller 50 skips the charged-amount determination processing at step S5 and then proceeds to the processing at step S4.

Meanwhile, when the control states of the respective control target devices are determined to be stable as a result of the determination processing at step S11, the air-conditioning controller 50 executes the charged-amount determination processing (S5). The contents of the charged-amount determination processing at step S5 are the same as those in the first embodiment and thus a description thereof will be omitted.

The contents of other air-conditioning control processing are the same as those in the first embodiment. The refrigeration cycle device 10 in this embodiment can obtain the functions and effects exhibited by the components common to those in the first embodiment, in the same manner as in the first embodiment.

In particular, the refrigeration cycle device 10 in this embodiment is configured to execute the charged-amount determination processing in the normal air-conditioning processing when the control states of various control target devices are stable. Thus, the refrigeration cycle device 10 in this embodiment can appropriately determine whether the refrigeration cycle device is in the refrigerant shortage state or not, regardless of the timing of the pre-air-conditioning, the automatic air-conditioning, and the like.

Also, in the configuration of this embodiment, while the vehicle is traveling, the volume of air flowing into the exterior heat exchanger 14 changes, and thereby the heat dissipation capacity of the interior condenser 12 might vary unintentionally. Thus, the charged-amount determination processing is desirably executed when the vehicle is stopped.

Other Embodiments

Although the embodiments of the present disclosure have been described above, the present disclosure is not limited to the above-mentioned embodiments, and various modifications and changes can be made thereto. For example, the following modifications and changes can be made to the embodiments.

(1) Like each of the above-mentioned embodiments, whether the refrigeration cycle device is in the refrigerant shortage state or not is desirably determined in the charged-amount determination processing based on the change in the discharge refrigerant pressure Ph, which shows the tendency to decrease the heat dissipation amount of the interior condenser 12. However, the present disclosure is not limited thereto. For example, in the charged-amount determination processing, whether the refrigeration cycle device is in the refrigerant shortage state or not may be determined based on a change in the blown-air temperature TAV from the interior air-conditioning unit 30, a change in the temperature of the interior condenser 12, a superheat degree SH of the suction refrigerant drawn into the compressor 11, or the like.

(2) Like each of the above-mentioned embodiments, when the refrigeration cycle device is determined to be in the refrigerant shortage state during the charged-amount determination processing, the compressor 11 is desirably stopped. However, the present disclosure is not limited thereto. For example, when the refrigeration cycle device is determined to be in the refrigerant shortage state in the charged-amount determination processing, the refrigeration cycle device may perform a degenerate operation or the like that involves forcibly decreasing the number of revolutions Nc of the compressor 11.

(3) Like each of the above-mentioned embodiments, when the refrigeration cycle device is determined to be in the refrigerant shortage state during the charged-amount determination processing, it is desirable to inform the occupant that the refrigeration cycle device is in the refrigerant shortage state. However, the present disclosure is not limited thereto, and, for example, the occupant may not be informed of the refrigerant shortage state.

(4) In the description of each of the above-mentioned embodiments, the refrigeration cycle device 10 according to the present disclosure is used in the vehicle air conditioner 1 that is switchable among the air-cooling mode, the dehumidification heating mode, and the air-heating mode by way of example. However, the present disclosure is not limited thereto. The refrigeration cycle device 10 in the present disclosure may be used in the vehicle air conditioner 1 that is capable of achieving any one of the air-cooling mode, the dehumidification heating mode, and the air-heating mode.

(5) In the description of each of the above-mentioned embodiments, in the dehumidification heating mode, the air-conditioning controller 50 operates the compressor 11 while setting the low-pressure side on-off valve 20 in the closed state, the first expansion valve 13 in the fully open state, and the second expansion valve 18 in the throttle state by way of example. However, the present disclosure is not limited thereto. For example, the throttle states of the respective expansion valves 13 and 18 may be changed in accordance with the detected values from the group of the respective sensors. Such an arrangement of changing the throttle states of the respective expansion valves 13 and 18 can cause the exterior heat exchanger 14 to serve as the radiator and also as the heat absorber in the dehumidification heating mode. Thus, the amount of heat dissipation in the interior condenser 12 can be adjusted, thereby making it possible to appropriately adjust the temperature of the ventilation air in the dehumidification heating mode.

(6) In the description of each of the above-mentioned embodiments, the refrigeration cycle device 10 according to the present disclosure can be used in the vehicle air conditioner 1 by way of example. However, the present disclosure is not limited thereto. The refrigeration cycle device 10 according to the present disclosure is not limited to one dedicated for vehicles, but may be applied to a stationary air conditioner, a cold storage, a liquid heating and cooling device, and the like.

(7) It is obvious that in the above-mentioned embodiments, elements configuring the embodiments are not necessarily essential particularly unless otherwise specified and except when clearly considered to be essential in principle.

(8) When referring to a specific number about a component in the above-mentioned embodiments, including the number, a numerical value, an amount, a range, and the like, the component should not be limited to the specific number particularly except when clearly determined to be essential and except when obviously limited to the specific number in principle.

(9) When referring to the shape, positional relationship, and the like of a component in the above-mentioned embodiments, the component should not be limited to the shape, positional relationship, and the like unless otherwise specified and except when limited to the specific shape, positional relationship, or the like in principle.

What is claimed is:

1. A refrigeration cycle device comprising:
 a compressor that compresses and discharges a refrigerant;
 a radiator that dissipates heat from a high-pressure refrigerant discharged from the compressor;
 a decompression device that decompresses the high-pressure refrigerant having passed through the radiator;
 an evaporator that evaporates a low-pressure refrigerant decompressed by the decompression device;
 an accumulator that separates the low-pressure refrigerant having passed through the evaporator into a gas phase refrigerant and a liquid phase refrigerant and causes the separated gas phase refrigerant to flow out toward a side of a suction port of the compressor;
 a charged-amount determination unit configured to execute a charged-amount determination so as to determine a refrigerant shortage state of the refrigeration cycle device;
 a compressor control unit that controls an operating state of the compressor; and
 a decompression control unit that controls a throttle opening degree of the decompression device, wherein the charged-amount determination unit determines the refrigerant shortage state, based on a determination that a heat dissipation capacity of the radiator decreases in a case where the decompression control unit decreases a throttle opening degree of the decompression device while the compressor control unit operates the compressor.

2. The refrigeration cycle device according to claim 1, further comprising:
a high-pressure side pressure detector that detects a pressure of the high-pressure refrigerant that leads from a side of a refrigerant discharge port of the compressor to a side of a refrigerant inlet of the decompression device, wherein
the charged-amount determination unit determines that the refrigeration cycle device is in the refrigerant shortage state in a case where the pressure of the high-pressure refrigerant decreases when the decompression control unit decreases the throttle opening degree of the decompression device while the compressor control unit operates the compressor.

3. The refrigeration cycle device according to claim 1 being used for an air conditioner for a vehicle to perform air-conditioning of a vehicle interior, wherein
the air conditioner for a vehicle is capable of executing a pre-air-conditioning in which the vehicle interior is air-conditioned by operating the compressor before an occupant rides on the vehicle,
the compressor control unit and the decompression control unit are configured to decrease the throttle opening degree of the decompression device while the number of revolutions of the compressor is maintained at a constant value when executing the pre-air-conditioning, and
the charged-amount determination unit determines the refrigerant shortage state when executing the pre-air-conditioning.

4. The refrigeration cycle device according to claim 1, being used in an air conditioner for a vehicle to perform air-conditioning of a vehicle interior, wherein
the air conditioner for a vehicle is capable of executing automatic air-conditioning in which a temperature of ventilation air to be blown into the vehicle interior is automatically adjusted,
the compressor control unit and the decompression control unit are configured to decrease the throttle opening degree of the decompression device while the number of revolutions of the compressor is maintained at a constant value when executing the automatic air-conditioning, and
the charged-amount determination unit determines the refrigerant shortage state when executing the automatic air-conditioning.

5. The refrigeration cycle device according to claim 1, wherein
the compressor control unit stops an operation of the compressor when the charged-amount determination unit determines the refrigerant shortage state.

6. The refrigeration cycle device according to claim 1, further comprising:
an informing unit that informs a user that it is in the refrigerant shortage state, when the charged-amount determination unit determines the refrigerant shortage state.

7. A refrigeration cycle device comprising:
a compressor that compresses and discharges a refrigerant;
a radiator that dissipates heat from a high-pressure refrigerant discharged from the compressor;
an expansion valve that decompresses the high-pressure refrigerant having passed through the radiator;
an evaporator that evaporates a low-pressure refrigerant decompressed by the expansion valve;
an accumulator that separates the low-pressure refrigerant having passed through the evaporator into a gas phase refrigerant and a liquid phase refrigerant and causes the separated gas phase refrigerant to flow out toward a side of a suction port of the compressor; and
a controller configured to:
execute a charged-amount determination so as to determine a refrigerant shortage state of the refrigeration cycle device;
control an operating state of the compressor; and
control a throttle opening degree of the expansion valve, wherein
the controller determines the refrigerant shortage state, based on a determination that a heat dissipation capacity of the radiator decreases in a case where the controller decreases a throttle opening degree of the expansion valve while the controller operates the compressor.

8. The refrigeration cycle device according to claim 7, further comprising:
a high-pressure side pressure detector that detects a pressure of the high-pressure refrigerant that leads from a side of a refrigerant discharge port of the compressor to a side of a refrigerant inlet of the expansion valve, wherein
the controller determines that the refrigeration cycle device is in the refrigerant shortage state in a case where the pressure of the high-pressure refrigerant decreases when the controller decreases the throttle opening degree of the expansion valve while the controller operates the compressor.

9. The refrigeration cycle device according to claim 7 being used for an air conditioner for a vehicle to perform air-conditioning of a vehicle interior, wherein
the air conditioner for a vehicle is capable of executing a pre-air-conditioning in which the vehicle interior is air-conditioned by operating the compressor before an occupant rides on the vehicle,
the controller is configured to decrease the throttle opening degree of the expansion valve while the number of revolutions of the compressor is maintained at a constant value when executing the pre-air-conditioning, and
the controller determines the refrigerant shortage state when executing the pre-air-conditioning.

10. The refrigeration cycle device according to claim 7, being used in an air conditioner for a vehicle to perform air-conditioning of a vehicle interior, wherein
the air conditioner for a vehicle is capable of executing automatic air-conditioning in which a temperature of ventilation air to be blown into the vehicle interior is automatically adjusted,
the controller is configured to decrease the throttle opening degree of the expansion valve while the number of revolutions of the compressor is maintained at a constant value when executing the automatic air-conditioning, and
the controller determines the refrigerant shortage state when executing the automatic air-conditioning.

11. The refrigeration cycle device according to claim 7, wherein
the controller stops an operation of the compressor when the controller determines the refrigerant shortage state.

12. The refrigeration cycle device according to claim 7, further comprising:
an informing unit that informs a user that it is in the refrigerant shortage state, when the controller determines the refrigerant shortage state.

* * * * *